United States Patent
Cao et al.

(10) Patent No.: US 11,190,396 B1
(45) Date of Patent: Nov. 30, 2021

(54) STRUCTURE FOR LOW-POWER-LOW-RATE DATA TRANSMISSION IN A WIRELESS NETWORK

(71) Applicant: NXP USA, Inc., Austin, TX (US)

(72) Inventors: Rui Cao, Fremont, CA (US); Hongyuan Zhang, Fremont, CA (US); Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/141,103

(22) Filed: Sep. 25, 2018

Related U.S. Application Data

(63) Continuation-in-part of application No. 15/332,531, filed on Oct. 24, 2016, now Pat. No. 10,165,094.

(60) Provisional application No. 62/562,867, filed on Sep. 25, 2017, provisional application No. 62/245,495, filed on Oct. 23, 2015.

(51) Int. Cl.
| | |
|---|---|
| *H04L 29/06* | (2006.01) |
| *H04W 4/00* | (2018.01) |
| *H04L 12/24* | (2006.01) |
| *H04L 27/22* | (2006.01) |
| *H04L 27/20* | (2006.01) |
| *H04W 84/12* | (2009.01) |

(52) U.S. Cl.
CPC ......... *H04L 41/0803* (2013.01); *H04L 27/20* (2013.01); *H04L 27/22* (2013.01); *H04L 69/22* (2013.01); *H04W 84/12* (2013.01)

(58) Field of Classification Search
CPC ............. H04L 5/0007; H04L 27/2628; H04W 72/0446; H04W 4/005
See application file for complete search history.

(56) References Cited

U.S. PATENT DOCUMENTS

| | | | |
|---|---|---|---|
| 9,942,008 B1 | 4/2018 | Sun et al. | |
| 10,129,064 B1* | 11/2018 | Lee | ...... H04L 27/2627 |
| 2012/0324315 A1* | 12/2012 | Zhang | ...... H04L 1/0043 |
| | | | 714/776 |
| 2015/0146653 A1* | 5/2015 | Zhang | ...... H04L 27/2603 |
| | | | 370/329 |
| 2015/0327276 A1 | 11/2015 | Rebeiz et al. | |
| 2016/0226692 A1 | 8/2016 | Kenney et al. | |
| 2016/0227436 A1 | 8/2016 | Vermani et al. | |
| 2016/0261434 A1* | 9/2016 | Hsu | ...... H04L 27/0012 |

(Continued)

OTHER PUBLICATIONS

Moon et al.,"802.11ax Preamble Design and Auto-detection", IEEE 802.11-15/0823r3, Sep. 2015 (Year: 2015).*

(Continued)

*Primary Examiner* — Aristocratis Fotakis

(57) ABSTRACT

Embodiments described herein provides a system for detecting data received in a low power low rate (LPLR) data frame format. A mixed mode LPLR frame may be falsely detected by an 802.11n device as an 802.11n packet. When the false detection occurs, the PHY-CAA indication may be erroneously set, which leads to a communication error. To prevent the false detection by an 802.11n device, embodiments described herein describes adding a redundant "dummy" 4 μs orthogonal frequency division multiplexing (OFDM) symbol with binary phase-shift keying (BPSK) modulation before the LPLR preamble in the LPLR frame, to differentiate from data symbols in an 802.11n packet.

21 Claims, 12 Drawing Sheets

(56) References Cited

U.S. PATENT DOCUMENTS

| | | | |
|---|---|---|---|
| 2016/0295559 A1* | 10/2016 | Bharadwaj | H04L 5/0053 |
| 2016/0330300 A1 | 11/2016 | Josiam et al. | |
| 2017/0013092 A1 | 1/2017 | Chen et al. | |
| 2017/0019891 A1* | 1/2017 | Rong | H04L 5/0007 |
| 2017/0048823 A1 | 2/2017 | Bharadwaj et al. | |
| 2017/0099089 A1* | 4/2017 | Liu | H04L 25/022 |
| 2017/0171861 A1* | 6/2017 | Seok | H04W 74/0816 |
| 2017/0201906 A1* | 7/2017 | Liu | H04L 27/2607 |
| 2017/0272976 A1* | 9/2017 | Yang | H04W 28/065 |
| 2018/0014329 A1* | 1/2018 | Lee | H04W 74/0816 |
| 2018/0123757 A1* | 5/2018 | Ko | H04L 27/18 |
| 2018/0206192 A1* | 7/2018 | Vermani | H04L 5/0094 |
| 2018/0343614 A1* | 11/2018 | Cao | H04W 28/065 |
| 2019/0230197 A1 | 7/2019 | Sun et al. | |
| 2020/0137770 A1* | 4/2020 | Chitrakar | H04W 72/0446 |
| 2020/0220760 A1* | 7/2020 | Huang | H04L 27/2602 |

OTHER PUBLICATIONS

Porat et al, "Autodetection with Signature Symbol", IEEE 802.11 15/0643, Broadcom, May 11, 2015 (Year: 2015).*

Moon et al, "Preamble Auto Detection in 802.11ax", IEEE802.11 15/0360r1, Newracom, Mar. 8, 2015 (Year: 2015).*

Song et al, "Considerations on 11 ax Auto-detection Methods", IEEE 802.11-14/0081r1, KAIST, Jan. 13, 2015 (Year: 2015).*

Zhang et al, "802.11ax Preamble Design and Auto-detection", IEEE 802.11 15/0579, May 10, 2015 (Year: 2015).*

Noh et al ("Preamble Structure in 802.11ax", IEEE 802.11-15/0575r0, May 2015) (Year: 2015).*

Moon et al ("Preamble Auto-Detection in 802.11ax", Newracom, IEEE 802.11-15/0360r1, Mar. 2015) (Year: 2015).*

Lui et al ("SIG-A Structure in 11ax Preamble", IEEE 802.11-15/0822r2, Jul. 2015) (Year: 2015).*

Lanante et al ("Extensible Preamble Format Design", IEEE 802.11-14/0853r0, Jul. 2015) (Year: 2015).*

Hsu et al ("Bandwidth and Packet Type Detection Schemesfor 40-50GHz Millimeter Wave Communication Systems", MediaTek Inc, IEEE 802.11-15/0706r1, May 2015) (Year: 2015).*

Final Office Action for U.S. Appl. No. 16/226,174 dated Feb. 5, 2020, 11 pages.

Notice of Allowance for U.S. Appl. No. 16/226,174, dated May 15, 2020, 10 pages.

Notice of Allowance for U.S. Appl. No. 16/226,174 dated Aug. 26, 2020, 15 pages.

* cited by examiner

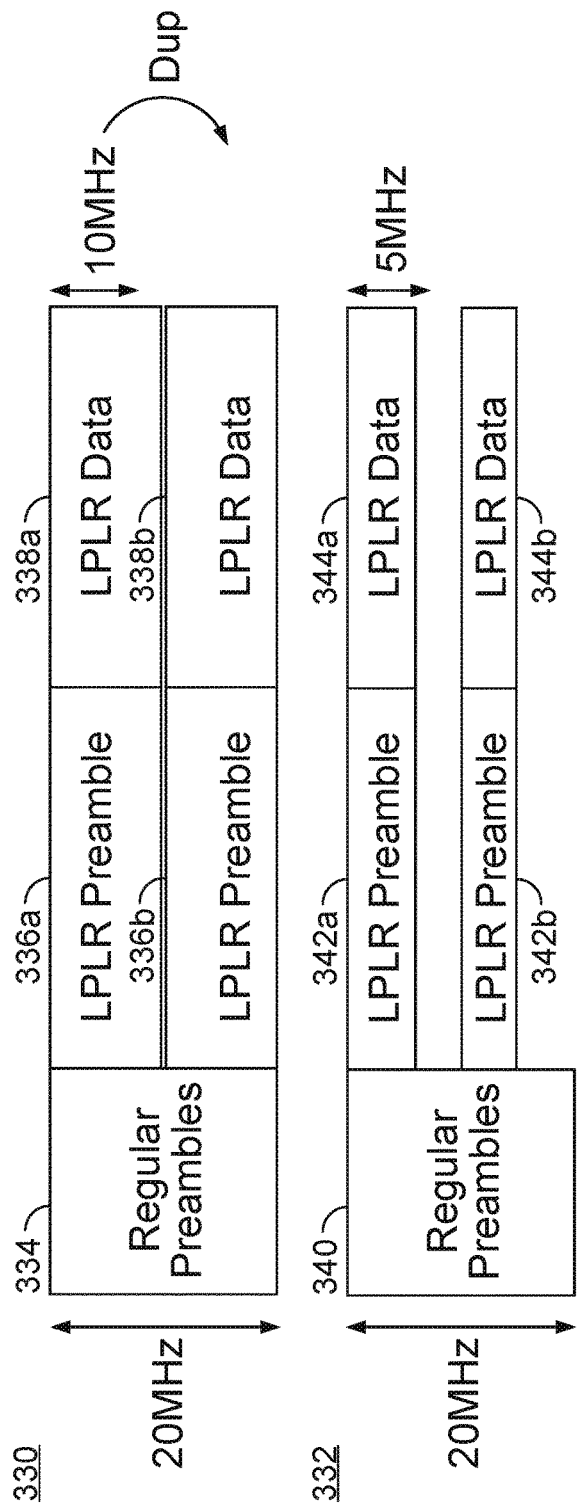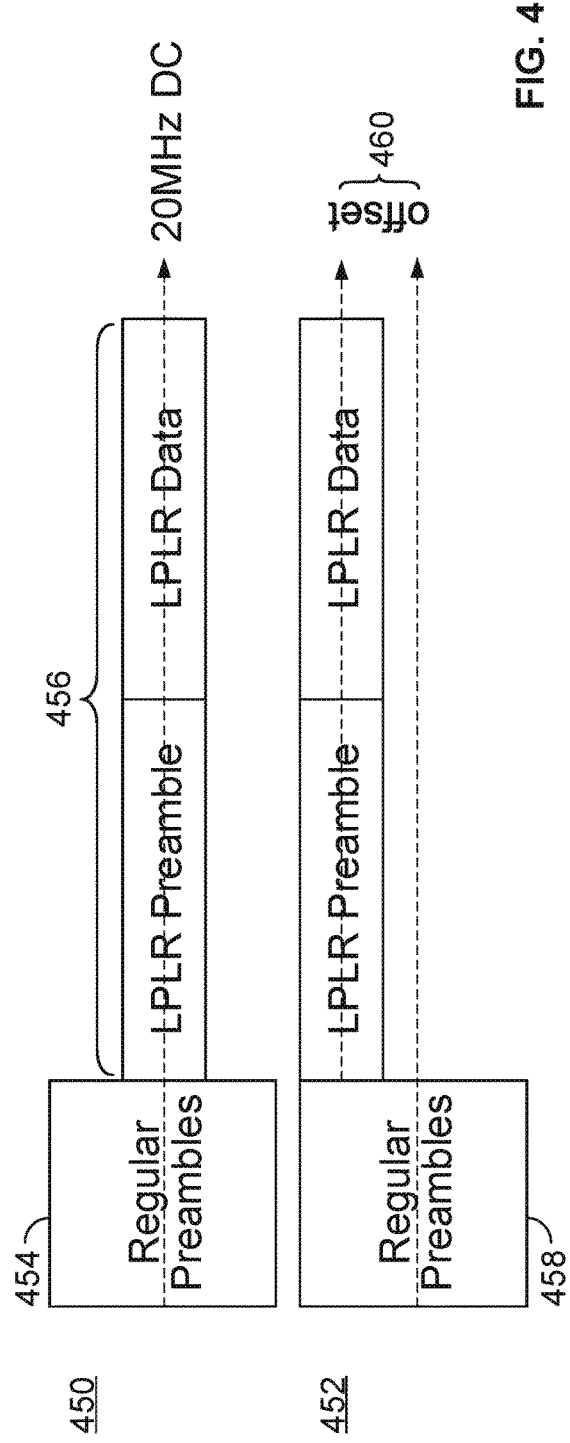

500

|  | BW | FFT | Tone Spacing (KHz) | Tone Plan |
|---|---|---|---|---|
| Example 1 | 10MHz | 64 | 156.25 | 11a or 11ac 20MHz |
| Example 2 | 10MHz | 32 | 312.5 | 11ah 1MHz |
| Example 3 | 5MHz | 64 | 78.125 | 11a or 11ac 20MHz |
| Example 4 | 5MHz | 32 | 156.25 | 11ah 1MHz |
| Example 5 | 2MHz | 64 | 31.25 | 11a or 11ac 20MHz |
| Example 6 | 2MHz | 32 | 62.5 | 11ah 1MHz |

700

|  | FFT | Tone spacing (KHz) | K | Period (us) | L |
|---|---|---|---|---|---|
| Example 1 | 64 | 78.125 | 4 | 3.2 | 5,6,7,8,9,10,... |
| Example 2 | 64 | 78.125 | 8 | 1.6 | 5,6,7,8,9,10,... |
| Example 3 | 64 | 78.125 | 16 | 0.8 | 5,6,7,8,9,10,... |
| Example 4 | 32 | 156.25 | 4 | 1.6 | 5,6,7,8,9,10,... |
| Example 5 | 32 | 156.25 | 8 | 0.8 | 5,6,7,8,9,10,... |

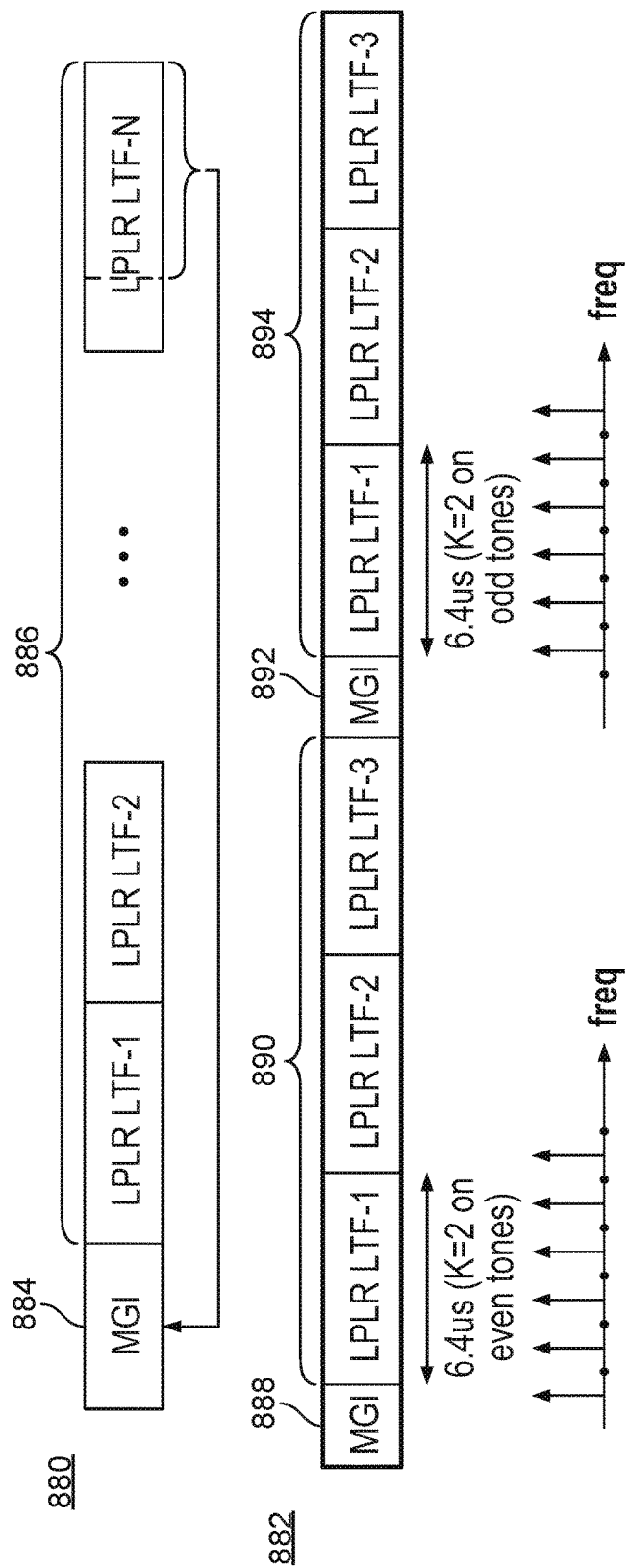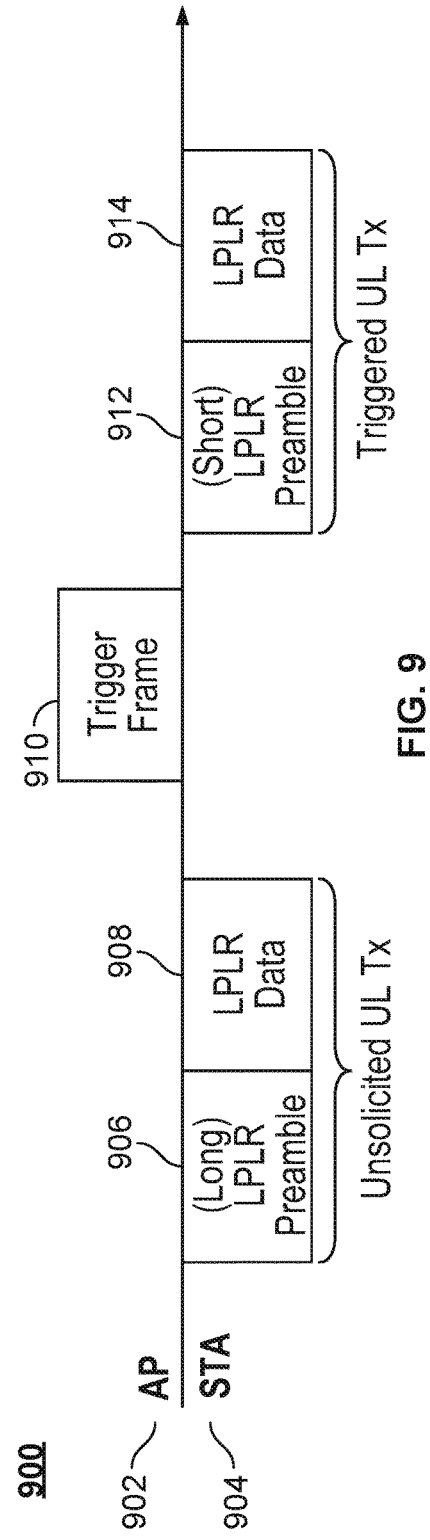
FIG. 8
FIG. 9

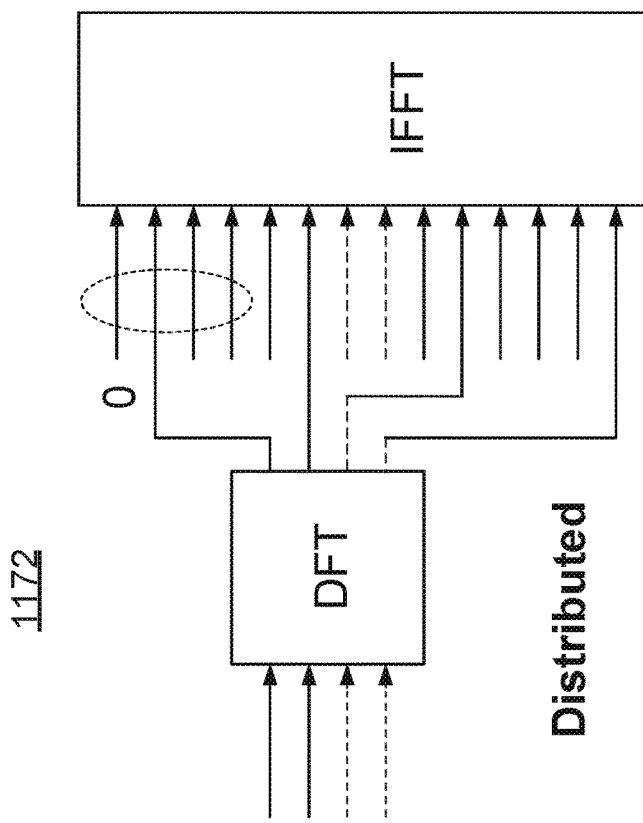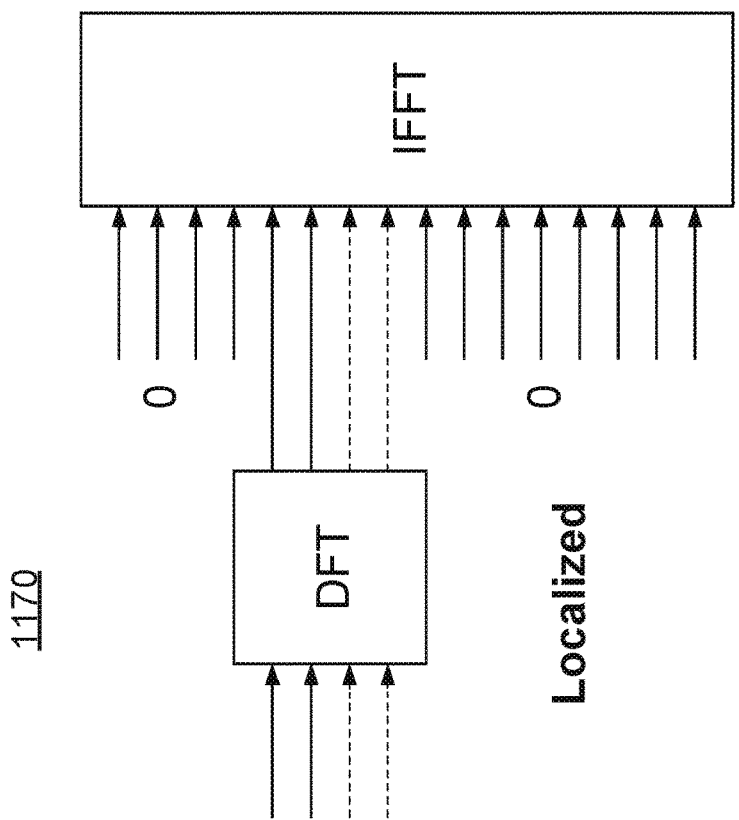
FIG. 11

1400

Receive a Data Frame Comprising an LPLR Preamble and an LPLR Data Portion Following the LPLR Preamble Portion 1402

Determine a Mode of the Data Frame based on Whether the Data Frame Includes Another Portion in Addition to the LPLR Preamble and LPLR Data Portion 1404

Detect or Recover a Data Field of the LPLR Preamble from the Data Frame based at least in part on the Mode of the Data Frame 1406

FIG. 14

STRUCTURE FOR LOW-POWER-LOW-RATE DATA TRANSMISSION IN A WIRELESS NETWORK

CROSS REFERENCE TO RELATED APPLICATION

This disclosure claims the benefit under 35 U.S.C. § 119(e) of U.S. Provisional Application No. 62/562,867, filed on Sep. 25, 2017.

This disclosure is also a continuation-in-part of and claims the benefit under 35 U.S.C. § 120 of commonly-assigned and co-pending U.S. application Ser. No. 15/332,531, filed on Oct. 24, 2016, which in turn claims the benefit under 35 U.S.C. § 119(e) of U.S. Provisional Application No. 62/245,495, filed on Oct. 23, 2015.

The aforementioned applications are all incorporated herein by reference in their entireties.

FIELD OF USE

This disclosure relates generally to a low-power-low-rate (LPLR) data frame format, and more particularly to providing a structure for LPLR data transmission with low complexity and high reliability.

BACKGROUND

Wireless local area network (WLAN) is a wireless computer network that uses the IEEE 802.11 group of standards that have been used to supply wireless connections for human users, including 11a/b/g, 11n, 11ac, and 11ax. There is an increasing need to provide wireless connections for non-human devices for the Internet of things (IoT), in which physical devices have network connectivity. Such physical devices may be found in vehicles and buildings, and are often embedded with electronics, sensors, and actuators. These IoT device often do not need a high data rate for transmission, but can be sensitive to power consumption and signal coverage. Transmission protocols that accommodate lower power and lower rate transmission for such IoT devices are yet to be defined under the current IEEE 802.11 group of standards.

SUMMARY

Embodiments described herein provides a system for detecting data received in a low power low rate (LPLR) data frame format.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 3 is a diagram of two illustrative frame formats when a narrow band signal is duplicated, in accordance with an embodiment of the present disclosure;

FIG. 4 is a diagram of two illustrative frame formats when a narrow band signal is offset, in accordance with an embodiment of the present disclosure;

FIG. 8 is a diagram of two illustrative LPLR frame transmissions when multiple copies of the LPLR LTF are transmitted, in accordance with an embodiment of the present disclosure;

FIG. 9 is a diagram of uplink and downlink transmissions of LPLR data, in accordance with an embodiment of the present disclosure;

FIG. 11 is a diagram of an illustrative block diagram of localized and distributed processing, in accordance with an embodiment of the present disclosure;

FIG. 14 is a high level flow chart for a process for detecting data in an LPLR format, in accordance with an embodiment of the present disclosure.

DETAILED DESCRIPTION

This disclosure generally relates to a low-power-low-rate (LPLR) data frame format, as well as a structure for LPLR data transmission with low complexity and high reliability. To provide an overall understanding of the disclosure, certain illustrative embodiments will now be described, including an LPLR data frame format that includes at least an LPLR preamble portion and an LPLR data portion that occupy a frequency bandwidth less than an allowed bandwidth. However, it will be understood by one of ordinary skill in the art that the systems and methods described herein may be adapted and modified as is appropriate for the application being addressed, and that the systems and methods described herein may be employed in other suitable applications, and that such other additions and modifications will not depart from the scope thereof.

A LPLR frame that occupies a frequency bandwidth no wider than 20 MHz is provided, which may be transmitted over a wide range of frequencies, such as at 2.4 GHz, 5 GHz, below 1 GHz, above 1 GHz or others. For example, the LPLR frame may employ a mixed mode structure, starting with a regular preamble with tone spacing of 312.5 KHz, and followed by a LPLR preamble and the payload data. In general and as is described below, the LPLR frame includes at least some portions that occupy a frequency bandwidth that is less than an allowed bandwidth (e.g., 20 MHz). The LPLR frame structure described herein provides a 5-10 dB improvement over the existing structures, particularly the legacy preamble, which is described in detail below. With the systems and methods of the present disclosure, data transmission is highly reliable, yet has a relatively low complexity.

In some scenarios, the mixed mode LPLR frame may be falsely detected by an 802.11n device as an 802.11n packet. When the false detection occurs, the 802.11n device may erroneously set PHY.CCA indication to IDLE, and start packet transmission during the LPLR frame time, which may cause collision to the LPLR receiver. To prevent the false detection by an 802.11n device, embodiments described herein describes adding a redundant "dummy" 4 μs orthogonal frequency division multiplexing (OFDM) symbol with binary phase-shift keying (BPSK) modulation before the LPLR preamble in the LPLR frame, as described in FIG. 12.

Figure 1:
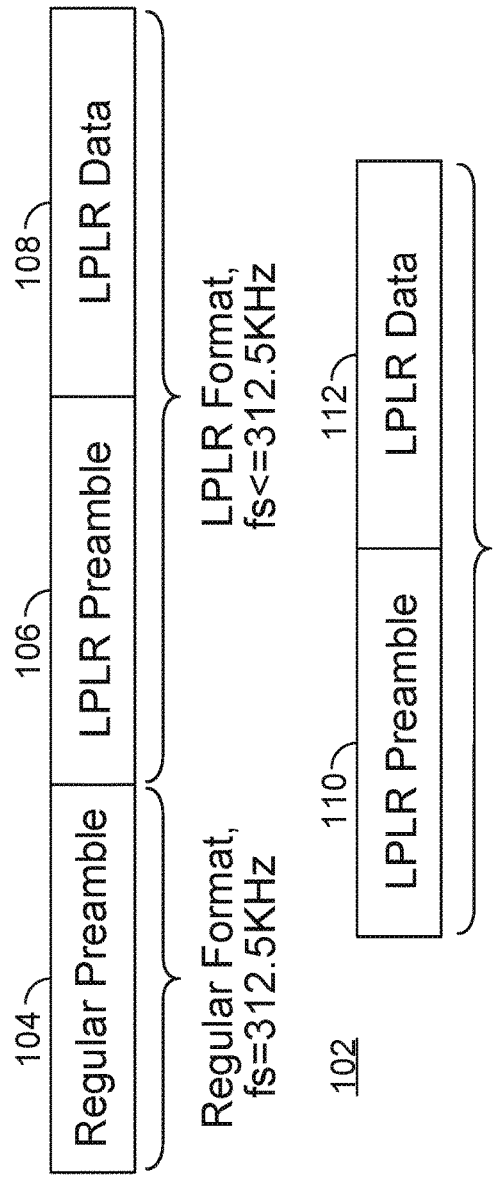
FIG. 1 is a diagram of two illustrative LPLR frame formats for mixed mode and single mode, in accordance with an embodiment of the present disclosure.

FIG. 1 is a diagram of two illustrative formats of an LPLR frame, in accordance with an embodiment of the present disclosure. The format of an LPLR frame may involve one of two modes: mixed mode and single mode. In the mixed mode LPLR frame format 100, a regular preamble 104 (e.g., a legacy preamble) is used with an LPLR format, which includes an LPLR preamble 106 and LPLR data 108. In the single mode LPLR frame format 102, no regular preamble is used, and only the LPLR format (including the LPLR preamble 110 and the LPLR data 112) is used. In either the mixed mode 100 or the single mode 102, the LPLR preamble 106 and 110 and the LPLR data 108 and 112 occupy a frequency bandwidth that is less than an allowed frequency bandwidth. In an example, the regular preamble may occupy the full allowed bandwidth, which may be 20 MHz. The LPLR preambles and the LPLR data may occupy a frequency bandwidth that is less than 20 MHz.

As depicted in FIG. 1, the regular preamble 104 in the mixed mode LPLR frame format 100 has a tone spacing of 312.5 kHz, while a different tone spacing may be used for the LPLR preamble 106 and LPLR data 108. Specifically, the tone spacing for the LPLR preamble 106 and LPLR data 108 may be 1/N of the tone spacing of the regular preamble 104, where N is a positive number. The mixed mode LPLR frame format 100 may be used as the frame format in 802.11ac, or 802.11n mixed mode.

The single mode LPLR frame format 102 includes an LPLR preamble 110 and LPLR data 112, which may be similar to the LPLR preamble 106 and the LPLR data 108 in the mixed mode LPLR frame format 100. Specifically, the tone spacing used in the single mode LPLR frame format 102 may be less than or equal to 312.5 kHz. The single mode LPLR frame format 100 may be used as the frame format in 802.11n Greenfield mode, in which an access point (AP) communicates only with 802.11n devices.

Figure 2:
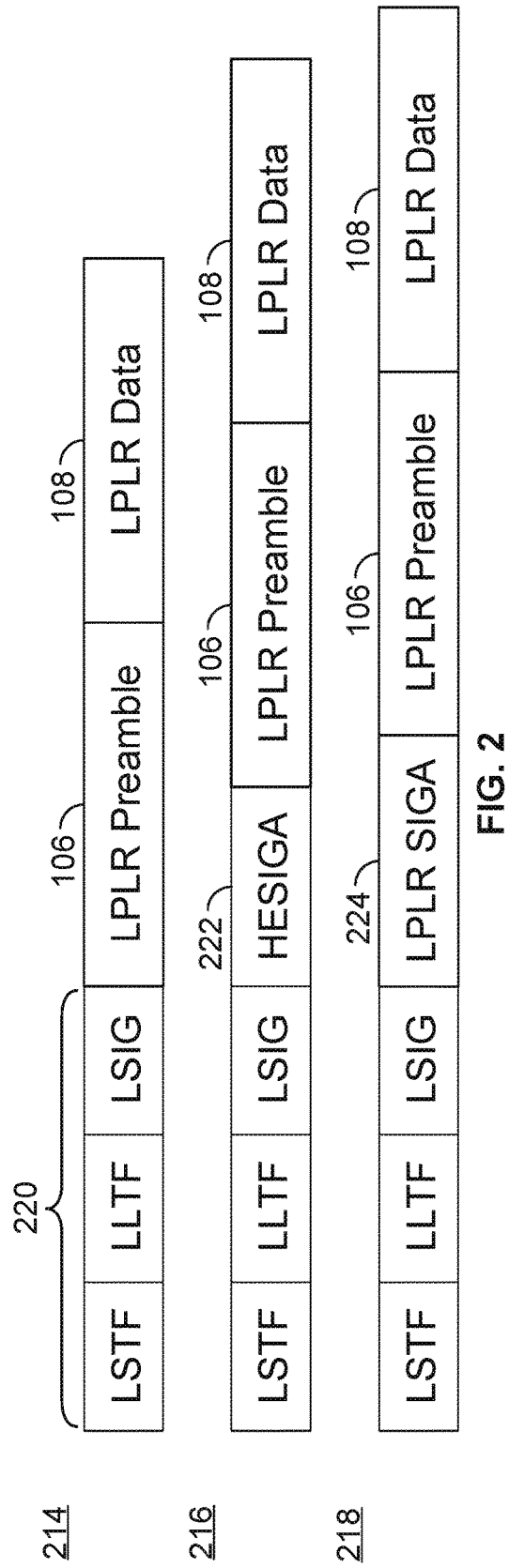
FIG. 2 is a diagram of three illustrative preamble formats for a mixed mode frame, in accordance with an embodiment of the present disclosure.

FIG. 2 is a diagram of three illustrative preamble formats for a mixed mode LPLR frame format, in accordance with an embodiment of the present disclosure. The first format 214 includes a regular preamble 220, followed by the LPLR preamble 106 and LPLR data 108 shown in FIG. 1. The regular preamble 220 includes information in the regular preamble 104. As depicted in FIG. 2, the regular preamble 220 of the first format 214 is a legacy preamble, which includes three fields: a legacy short training field (LSTF), a legacy long training field (LLTF), and a legacy signal (LSIG). The LSTF field may be used to detect a start of a data packet, while the LLTF field may be used for estimation of the channel or frequency offset as well as temporal synchronization. The LSIG field may include information related to data rate, data length, and parity data.

The second format 216 is similar to the first format 214, except that the preamble portion of the second format 216 additionally includes a HESIGA portion 222. Similar to the first format 214, the preamble portion of the second format 216 is followed by the LPLR preamble 106 and the LPLR data 108. The HESIGA portion 222 be used to protect the transmission of the mixed mode LPLR frame in the second format 216. Specifically, the HESIGA portion 222 may have a TxOP (transmission opportunity) duration, where TxOP refers to a scheme that enables a station to transmit multiple frames consecutively. Furthermore, the HESIGA portion 222 enables 802.11ax devices to defer properly, e.g., a device that is not intended for the transmission will not try to access the channel until a properly set delay. An 802.11n/ac device may be deferred using medium access control (MAC) signaling, which may not be accommodated by employing the transmission data format 214 alone.

The third format 218 is similar to the first format 214, except that the preamble portion of the third format 218 additionally includes an LPLR SIGA portion 224. Similar to the first format 214, the preamble portion of the third format 218 is followed by the LPLR preamble 106 and the LPLR data 108. The LPLR SIGA portion 224 may use a regular format of 312.5 kHz tone spacing.

In general, the regular preamble 104 for the mixed mode LPLR frame format 100 may include any of the preambles depicted in FIG. 2, and may include an LSTF field, an LLTF field, an LSIG field, and optionally a HESIGA field, an LPLR SIGA field, or both. In some implementations, the HESIGA and LRLR SIGA fields may be included in the same mixed mode preamble.

FIG. 3 is a diagram of two illustrative frame formats when a narrow band signal is duplicated, in accordance with an embodiment of the present disclosure. In particular, the regular preamble 104 may occupy a 20 MHz bandwidth when a 64-point Fast Fourier Transform (FFT) is used. In some implementations, the LPLR format is set to occupy a bandwidth narrower than the regular preamble 104. This narrower bandwidth may be referred to herein as an LPLR bandwidth. The LPLR bandwidth may be 10 MHz, 5 MHz, 2 MHz, 1 MHz, or any other suitable bandwidth less than the bandwidth of the regular preamble 104.

A narrower bandwidth for the LPLR format (compared to the regular preamble 104) may be desirable because for the same amount of total power, a narrower bandwidth means that the power spectral density is increased. A higher power spectral density in a signal may be desirable because allows for the signal to be transmitted over longer distances without comprising signal quality. If the regular preamble 104 was forced to occupy a narrow bandwidth, then the throughput of the data would be compromised. However, a low data rate is not a disadvantage in the LPLR framework.

When the LPLR format occupies a bandwidth that is narrower than the bandwidth that the regular preamble 104 occupies, the LPLR format may be duplicated in the frequency domain to occupy the full bandwidth of the regular preamble. As is depicted in FIG. 3, the frame format 330 includes a 20 MHz regular preamble 334 and a 10 MHz LPLR format (including a first LPLR preamble 336a and first LPLR data 338a), which occupies only half of the bandwidth of the regular preamble. The LPLR format is duplicated to form the second LPLR preamble 336b and the second LPLR data 338b, which are copies of the first LPLR preamble 336a and the first LPLR data 338a, respectively. As is shown in the frame format 330, the LPLR format signal is duplicated to occupy the full bandwidth of 20 MHz.

Duplicating the LPLR format signal to occupy the full bandwidth of 20 MHz means that the power spectral density of the signal is unchanged. However, the duplication provides an improvement in signal-to-noise ratio (SNR) because the LPLR format is transmitted multiple times, causing the noise in the transmission to be reduced by a factor of N, where N is the number of duplicates of the LPLR format.

In some embodiments, the duplication depicted in FIG. 3 is straightforward duplication, such that the duplicates are exact copies of each other. In other embodiments, the duplication may be performed in a manner that further improve the signal transmission. In one example, duplication may occur after a phase rotation, such that the first LPLR preamble 336a and first LPLR data 338a are out of phase relative to the second LPLR preamble 336b and the second LPLR data 338b. Combining the out-of-phase LPLR formats provides improvement in the SNR by reducing the peak-to-average power (PAPR). In some embodiments, duplication involves additional scrambling or permutation in the bit or symbol domain to provide further diversity or flexibility.

In the frame format 330, the LPLR format occupies 10 MHz. In general, the LPLR format may occupy a bandwidth that is 1/N of the bandwidth of the regular preamble 334. For example, the LPLR format may occupy a bandwidth of 5 MHz (N=4), and may be duplicated 4 times to occupy the full 20 MHz bandwidth. As another example, the LPLR format may occupy a bandwidth of 2 MHz (N=10), and may be duplicated 10 times to occupy the full 20 MHz bandwidth. In general, when the LPLR format occupies a bandwidth of 20/N MHz, the LPLR format may be duplicated N times to occupy the full 20 MHz bandwidth.

In some implementations, the LPLR format is duplicated in the frequency domain to occupy less than the full bandwidth of the regular preamble. The frame format 332 includes a 20 MHz regular preamble 340 and a 5 MHz LPLR format (including a first LPLR preamble 342a and first LPLR data 344a), which occupies only one fourth of the bandwidth of the regular preamble 340. The LPLR format is duplicated to form the second LPLR preamble 342b and the second LPLR data 344b, which are copies of the first LPLR preamble 342a and the first LPLR data 344a, respectively.

As is shown in the frame format 332, the LPLR format signal is duplicated to occupy only half of the full bandwidth of 20 MHz. In particular, the first LPLR format occupies a first quarter of the 20 MHz band (e.g., 0 to 5 MHz), and the duplicate LPLR format occupies a third quarter of the 20 MHz band (e.g., 10 to 15 MHz). A frequency gap may be used between duplicates in order to decrease an amount of interference between adjacent duplicates. Rather than occupying the full 20 MHz, only occupying half of the band as shown in the frame format 332 has an advantage of reducing noise by a factor of 2, while improving the power spectral density by a factor of 2 and gaining diversity.

The example frame formats 330 and 332 are shown by way of illustrative example only. In general, the number and/or locations of the duplicates may be fixed, dynamic according to PHY header signaling, or semi-static according to control/management frames.

FIG. 4 is a diagram of two illustrative frame formats 450 and 452 when a narrow band LPLR format 456 is offset, in accordance with an embodiment of the present disclosure. In particular, the LPLR formats 456 depicted in FIG. 4 occupy a narrower bandwidth than the bandwidth of the regular preamble (e.g., the regular preamble 454 of the frame format 450 and the regular preamble 458 of the frame format 452). However, unlike the examples described in relation to FIG. 3, the LPLR formats 456 are not duplicated in FIG. 4. Instead, the LPLR formats 456 may be offset to occupy different narrow bands within the bandwidth of the regular preamble.

In an example, the LPLR format 450 includes a regular preamble 454 and an LPLR format 456 that occupies a bandwidth that is centered around the center of the band of the regular preamble 454. In another example, the LPLR format 452 includes a regular preamble 458 and an LPLR format 456 that is offset from the center of the band by a frequency offset 460.

The frequency offset 460 may be fixed or dynamic. If the frequency offset 460 is dynamic, the frequency offset 460 may be updated after a certain time period with or without signaling. In one example, signaling may be performed according to a current PHY header or an earlier PHY header, or by control/management frames. The signaling allows for a determination that a change to the frequency offset 460 will occur. Alternatively, signaling may not be required. In one example, a device may have no information regarding the frequency offset, and so performs a blind search. After the device identifies the frequency offset 460, the device becomes phase locked to the appropriate period, and does not need signaling to remain synchronized with changes that occur in the frequency offset 460. This blind search may be performed when the device is initially turned on, or woken from a sleep state. In this case, signaling may not be required when the change to the frequency offset 460 is fixed or predetermined.

Figures 5, 6, 7:
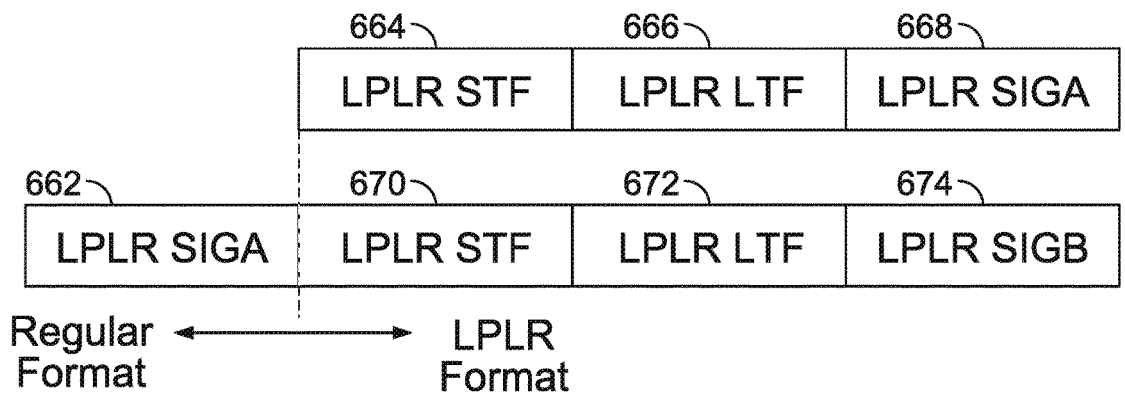
FIG. 5 is a table of six example LPLR format signals and their parameters, in accordance with an embodiment of the present disclosure.
FIG. 6 is a diagram of a preamble structure of an LPLR frame, in accordance with an embodiment of the present disclosure.
FIG. 7 is a table of five example LPLR format signals and their parameters when the LPLR bandwidth is 5 MHz, in accordance with an embodiment of the present disclosure.

FIG. 5 is a table of six example LPLR format signals, their parameters, and corresponding tone plans that may be used with these signals, in accordance with an embodiment of the present disclosure. In each example, a tone plan may involve reusing an existing tone plan, or a new tone plan may be defined. In a first example, the LPLR bandwidth is 10 MHz for a 64-point FFT with a tone spacing of 156.25 kHz. This first example may be used in accordance with the existing 11a or 11ac tone plan with 20 MHz. In a second example, the LPLR bandwidth is 10 MHz for a 32-point FFT with a tone spacing of 312.5 kHz. This second example may be used in accordance with the existing 11ah tone plan with 1 MHz. In a third example, the LPLR bandwidth is 5 MHz for a 64-point FFT with a tone spacing of 78.125 kHz. This third example may be used in accordance with the existing 11a or 11ac tone plan with 20 MHz. In a fourth example, the LPLR bandwidth is 5 MHz for a 32-point FFT with a tone spacing of 156.25 kHz. This fourth example may be used in accordance with the existing 11ah tone plan with 1 MHz. In a fifth example, the LPLR bandwidth is 2 MHz for a 64-point FFT with a tone spacing of 31.25 kHz. This fifth example may be used in accordance with the existing 11a or 11ac tone plan with 20 MHz. In a sixth example, the LPLR bandwidth is 2 MHz for a 32-point FFT with a tone spacing of 62.5 kHz. This sixth example may be used in accordance with the existing 11ah tone plan with 1 MHz. For example, the tone plan indicates how many and which tones are to be populated, and which tones are for data and which are for pilot. The 802.11 system have example multiple tone plans available for different bandwidths and systems. For example, "11ah 1 MHz" is the 802.11ah system operating in 1 MHz. The corresponding tone plan can be reused when LRLP BW=10 MHz and FFT is 32-point. Whether to reuse a tone plan generally depends on the FFT size.

FIG. 6 is a diagram of various LPLR preamble structures of an LPLR frame, in accordance with an embodiment of the present disclosure. The LPLR preamble structure shown in FIG. 6 may be used for any of the LPLR preambles described herein, including LPLR preamble 106, 110, 336, and 342, or within the LPLR format 456. As depicted in the top example of FIG. 6, the LPLR preamble structure includes an LPLR short training field (STF) 664, an LPLR long training field (LTF) 666, and an LPLR signaling field (LPLR SIGA 668), all of which are in the LPLR format of the LPLR frame. In the bottom example of FIG. 6, the LPLR preamble structure includes an LPLR SIGA field 662 in the regular format, followed by an LPLR STF 670, an LPLR LTF 672, and an LPLR SIGB field 674 in the LPLR format of the LPLR frame. Either the top example or the bottom example may be used for the LPLR preamble structure.

In some implementations, format of the LPLR preamble structure switches dynamically between the top and bottom examples of FIG. 6. The switch may occur via detection, by signaling in the PHY header, by signaling in the control/management frame, by frame type/deployment, or by other implicit signaling.

The LPLR STF fields 664 and 670 and the manner in which the LPLR STF is detected and used are next described in detail in relation to FIG. 7. The use and detection of the LPLR STF may depend on the location of a particular device relative to a WIFI network, and may depend on whether the mixed mode LPLR frame format 100 or the single mode LPLR frame format 102 are used.

In one example, some devices are positioned further away from a WIFI network, and thus are unable to use LSTF to sense the carrier. For these faraway devices, the LPLR STF may be used for carrier sensing, coarse carrier frequency offset correction, correction of symbol timing, setting of an automatic gain control (AGC), or any suitable combination thereof.

In another example, devices that are positioned within a regular WIFI zone are able to sense the carrier by LSTF. For these closer devices, the LPLR STF may be used for auto-detection of an LPLR frame. In this case, when the mixed mode LPLR frame format 100 is used, the device first detects the LSTF field. Then, after receiving a number of symbols, the device may attempt to detect LPLR STF, regardless of whether the LSIG is decoded correctly or not. If LPLR STF is detected, then the LPLR frame format is detected in the mixed mode 100. Other autodetection methods may be used together with LPLR STF detection.

Alternatively, for devices positioned within a regular WIFI zone, if LSTF is not detected, these devices may be configured to still attempt to search for an LPLR STF field. If LPLR STF is detected without having detected LSTF, then the LPLR frame format is detected in the single mode 102. In some embodiments, a device has two parallel tracks. A first track is configured to detect the presence of LSTF, and a second track is configured to detect the presence of LPLR STF. Depending on which track is able to detect an incoming data packet, or whether both tracks are able to detect an incoming data packet, then the specific frame format of the data packet may be determined (e.g., whether the format is in the mixed mode 100 or single mode 102).

In some implementations, the LPLR STF field reuses LSTF periodic signaling in the time domain, but with different parameters from the LSTF parameters. In particular, the LPLR STF field is periodic in the time domain, with L periods and each period having length T. In the frequency domain, the LPLR STF field occupies K tones. In other words, the LPLR STF transmits non-zero signals every K tones in frequency. For example, for an LPLR bandwidth having a tone spacing of $\Delta f_{LPLR}$, each period may be written as:

$$T = \frac{1}{\Delta f_{LPLR} \cdot K} = \frac{N_{FFT}}{BW_{LPLR} \cdot K}$$

where $BW_{LPLR}$ corresponds to the LPLR bandwidth, and $N_{FFT}$ corresponds to the length of the FFT. For example, in LSTF, if the number of tones K=4, a different K (e.g. 8, 16, etc.) can be used for LPLR STF.

FIG. 7 is a table of five example sets of parameters for an LPLR STF signal when the LPLR bandwidth is 5 MHz, in accordance with an embodiment of the present disclosure. In a first example, the FFT has length 64, tone spacing is 78.125 kHz, K is 4, T is 3.2 us, and L is at least 5. In a second example, the FFT has length 64, tone spacing is 78.125 kHz, K is 8, T is 1.6 us, and L is at least 5. In a third example, the FFT has length 64, tone spacing is 78.125 kHz, K is 16, T is 0.8 us, and L is at least 5. In a fourth example, the FFT has length 32, tone spacing is 156.25 kHz, K is 4, T is 1.6 us, and L is at least 5. In a fifth example, the FFT has length 32, tone spacing is 156.25 kHz, K is 8, T is 0.8 us, and L is at least 5. In general, any suitable combination of parameters may be used for LPLR STF that is in accordance with the equation above.

In some implementations, the LPLR STF is adaptive in one or more parameters. In particular, the duration of LPLR STF may be fixed or dynamic. For example, the LPLR STF duration may be fixed when the number of periods L is fixed, and may be dynamic when L is adaptive. By allowing the LPLR STF duration to change dynamically, efficiency and coverage may be improved. In particular, a shorter LPLR STF duration costs less in overhead, but a device may have fewer periods to perform carrier sensing and carrier frequency offset estimation. Conversely, a longer STF duration improves coverage but at the expense of system efficiency.

When the LPLR STF is adaptive, the dynamic change may be performed without signaling, such that the device may perform blind detection to detect the change to the LPLR STF duration. Alternatively, signaling may be performed in the control/management frame. Or signaling can be reflected in the PHY header. In some implementations, the duration of the LPLR STF may be forced to be at least as long as a minimum duration that is known to all the devices, such as 5 periods in the examples depicted in FIG. 7.

In some implementations, an AP may change the duration of the LPLR STF under any one or more of the following conditions: (1) after transmitting a control/management frame, (2) periodically changing the duration with an adjustable window, (3) occasionally changing the duration to help faraway devices to establish connection, and (4) changing the LPLR STF duration based on the type of frame (e.g., a beacon frame may be sent with a longer LPLR STF duration than a frame without a beacon).

In some implementations, downlink frames may use different LPLR STF parameters than uplink frames. In particular, uplink transmissions may have lower transmit power than downlink transmissions, such that a longer LPLR STF duration for uplink transmissions may be desirable to compensate for this UL/DL power offset. In an example, an AP may transmit the downlink frame using an LPLR STF of $K_{DL}$ tone sampling with $N_{DL}$ periods, while a station may transmit the uplink frame using an LPLR STF of $K_{UL}$ tone sampling with $N_{UL}$ periods. The parameters $N_{DL}$, $N_{UL}$, $K_{UL}$ and $K_{DL}$ may be arbitrarily set. The station may select an LPLR STF parameter based on an indication provided by the AP, a decision made by the station, or a combination of both.

The LPLR LTF fields 666 and 672 are next described in detail in relation to FIG. 8, which is a diagram of two illustrative LPLR frame transmissions when multiple copies of the LPLR LTF field are transmitted, in accordance with an embodiment of the present disclosure.

In some implementations, the LPLR LTF is able to provide channel estimation for faraway devices that may have up to 5-10 dB worse SNR tolerance than other WLAN devices. To improve the gain, the LPLR LTF field may be duplicated multiple times in the time domain to improve SNR. The LPLR LTF field may need to be configured to handle a channel with a long delay spread. For a narrower bandwidth for LPLR signals and smaller tone spacing, the frequency correlation between adjacent subcarriers may be higher. To remedy this, the LPLR LTF field may be downsampled to reduce overhead. In other words, down-sampling causes the LPLR LTF to be shorter in duration, which leads to less work required to process the LPLR LTF. Moreover, a shorter LPLR LTF duration may also help with correction of a fine carrier frequency offset.

In FIG. 8, two exemplary LPLR frame transmissions are depicted. In a first example transmission 880, MGI 884 refers to an M-times long guard interval (GI), which is a time interval to ensure that distinct transmissions do not interfere with each other in the time domain, and may be longer than a regular GI. The MGI 884 is M times longer than the GI used in the later data portions, where M is a positive number greater than one (and may not be an integer). In the transmission 880, N replicates 886 of the LPLR LTF are transmitted, where M and N may be the same or different. Moreover, after the N-th replicate of the LPLR LTF is transmitted, another MGI 884 is repeated before another N concatenated replicates of an LPLR LTF. In this respective example, 886 refers to N replicates of the same LPLR LTF field. After the N-th LPLR LTF and 880 returns to the MGI, the next set of N LPLR LTFs may be processed in a similar manner. In an example, M=2 and N=3, but in general, M and N may be any suitable positive integer. When M is greater than one, the MGI 884 of the transmission 880 is longer than a regular GI. Having a longer MGI interval 884 may be beneficial when the length of the channel is unknown or when only the rough timing of the channel is known. In this case, the longer MGI 884 provides flexibility between symbols, so that the device may accurately identify the timing of the symbols within the LPLR LTF replicates 886.

In some implementations, the LPLR LTF is compressed. Each LPLR LTF signal in the frequency domain may only include non-zero values every K tones. This means that effectively, the LPLR LTF signal in the time domain is periodic with K periods in one FFT window. In this case, the device may transmit N LPLR LTF periods in the time domain, where N may be larger or smaller than K. In an example, a system may use an LPLR bandwidth of 5 MHz and a 64-point FFT. When M=2, N=3, and K=2, each period $T_{LTF}$ of the LPLR LTF signal is 6.4 us. If the GI for the data is 0.8 us and the LTF is repeated for 3 periods, then the length of the LPLR LTF symbol may be computed as 0.8*2+6.4*3=20.8 us, or $M*GI+T_{LTF}*N$.

In a second example transmission 882, the transmission 882 begins with a first MGI 888, followed by a first set of three copies of LPLR LTF 890, a second MGI 892, and a second set of three copies of LPLR LTF 894. As depicted in the transmission 882, multiple MGI LPLR LTF symbols may be used. Each LTF symbol may be compressed with the same or different sampling rate and/or duration. As shown in FIG. 8, the first set 890 and the second set 894 of the copies of LPLR LTF are offset in frequency. In this case, N=3. Assuming that M=2, two LPLR LTF symbols are transmitted in the transmission 882. The first LPLR LTF symbol (in the first set 890) uses K=2 on each even tone with 3 repetitions, and the second LTF symbol (in the second set 894) uses K=2 on each odd tone with 3 repetitions. Such offset frequency sampling as shown in the transmission 882 may be used to avoid the need to perform channel interpolation.

In some implementations, the LPLR LTF fields 890 and 894 are downsampled. In particular, devices that use LPLR frames (e.g., transmit and receive data formatted in LPLR frames) have a low cost. The LPLR LTF field may be used to finetune the CFO detection and symbol timing. One problem associated with this is that with the narrow tone spacing associated with LPLR frame formats, the length of the signal is long in the time domain. When the duration of the LPLR LTF field is too long, the phase difference may be greater than $2\pi$, which leads to ambiguity in performing the fine-tuning. Accordingly, downsampling may be performed such that the LPLR LTF field is restricted to have a short duration to avoid such ambiguities.

FIG. 9 is a diagram 900 of uplink and downlink transmissions of LPLR data, in accordance with an embodiment of the present disclosure. In particular, a base station 904 communicates uplink transmissions to an AP 902, which communicates downlink transmissions back down to the base station 904. When LPLR data is transmitted between the base station 904 and the AP 902, the LPLR STF field may be adaptive, based on whether an uplink transmission is solicited or unsolicited by the AP 902.

As is shown on the left side of the diagram 900, a long LPLR preamble 906 followed by LPLR data 908 form an unsolicited uplink transmission. This uplink transmission is unsolicited because there is no trigger message. In this case, a long LPLR preamble is used to allow the AP 902 more time to process the incoming frame and detect the LPLR format.

The right side of the diagram 900 shows a trigger frame 910 initiated by the AP 902 to the base station 904, followed by a triggered uplink transmission from the base station 904 that includes a short LPLR preamble 912 and LPLR data 914. Because this uplink transmission was transmitted in response to receiving the trigger frame 910, a shorter preamble format in the LPLR preamble 912 may be used because the AP 902 then expects to receive data in the LPLR format. In some implementations, the format of the preamble 912 is fixed (e.g., determined by the base station 904 in advance), or may be set according to information in the trigger frame 910.

Figure 10:
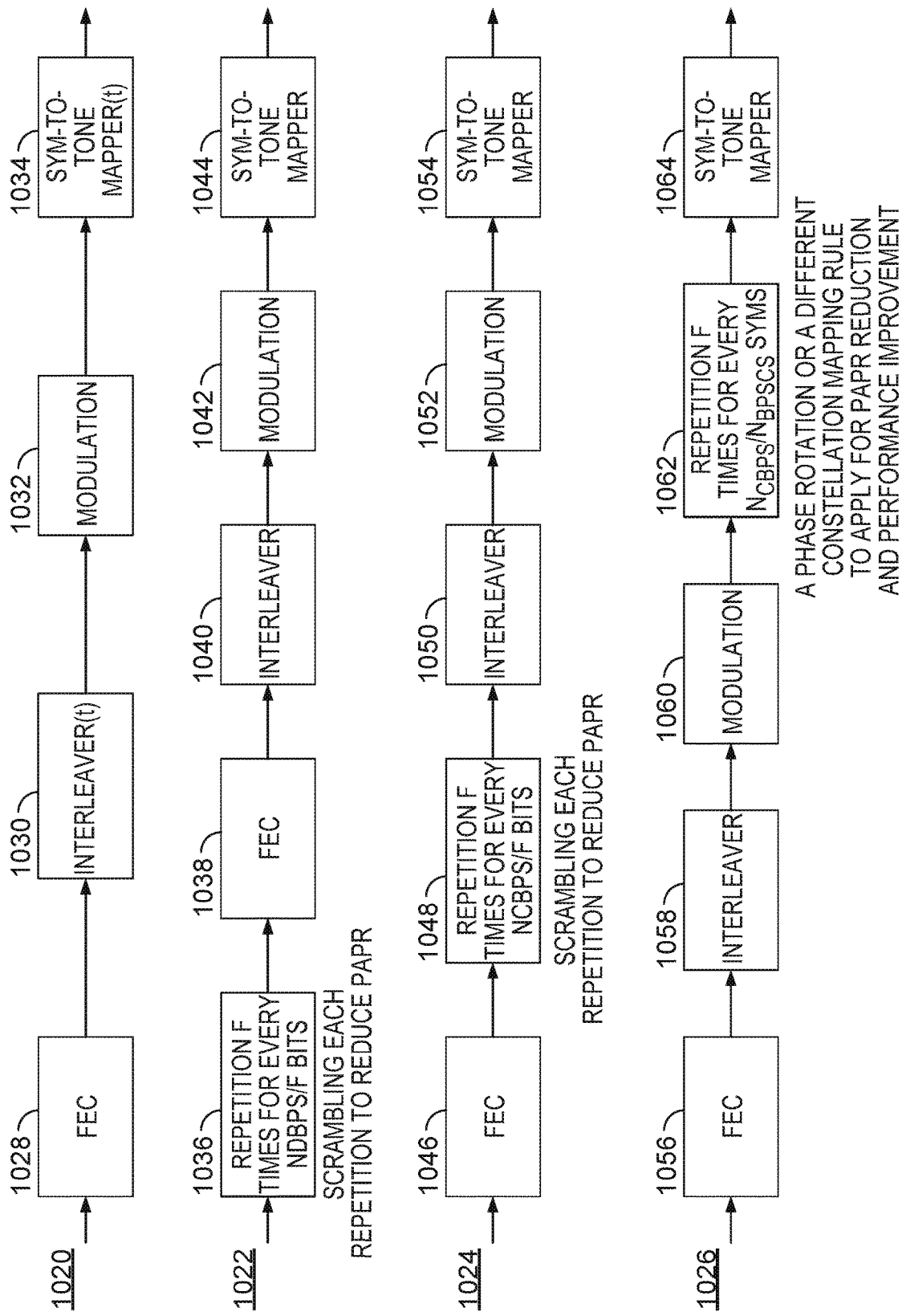
FIG. 10 depicts four illustrative block diagrams of processing LPLR data, including LPLR SIG repetition in time and LPLR SIG repetition in frequency, in accordance with an embodiment of the present disclosure.

The LPLR SIG fields 224, 662, 668, and 674 are next described in detail in relation to FIG. 10, which depicts four illustrative block diagrams of processing LPLR data, including LPLR SIG repetition in time and LPLR SIG repetition in frequency, in accordance with an embodiment of the present disclosure. Specifically, the LPLR SIG field may use FFT sizes and tone plans as described above. The modulation coding scheme (MCS) for the LPLR SIG field may be fixed or selected from a set of different MCS's and signaled. The signaling may be performed explicitly in regular PHY headers, implicitly in LSTF, LLTF, LPLR STF, LPLR LTF, or any suitable combination thereof, or in the control/management frames. In some implementations, the LPLR SIG field is encoded by Bitwise Balanced encoding (BBC), tail-biting BCC (TBCC), or low density parity check (LDPC) encoding. As is described in detail below, the LPLR SIG field may be repeated in time (e.g., as is described in relation to diagram 1020) or in frequency (e.g., as is described in relation to diagrams 1022, 1024, and 1026), or a combination of both time and frequency.

In a first diagram 1020, the LPLR SIG field is repeated in time with diversity to improve reliability. Examples of this time repetition is described in relation to U.S. patent application Ser. No. 14/618,692, which is incorporated herein by reference in its entirety. In particular, each LPLR symbol may be repeated T times, where each repeated symbol may have a different bit or symbol mapping. For the t-th repetition (where t=1 . . . T), the encoding procedure may involve the structure in the diagram 1020, which includes a forward error correction (FEC) block 1028, an interleaver 1030, a modulation block 1032, and a symbol-to-tone mapper 1034. In the first diagram 1020, the interleaver 1030 and the symbol-to-tone mapper 1034 are dependent on t, such that the interleaving and the symbol-to-tone mapping may be different for different repetitions, as is described in detail below.

In some implementations, the interleaver 1030 varies in time, and is dependent on t. In particular, if BCC or TBCC are used, the interleaver 1030 may be shifted for each repetition, according to:

$$i = \frac{N_{CBPS}}{N_{col}} \cdot ((k + \Delta(t)) \bmod N_{col}) + \left\lfloor \frac{k + \Delta(t)}{N_{col}} \right\rfloor$$

where i is the index of output bits from the interleaver; k is the index of input bits; $\Delta(t)$ corresponds to an offset for the t-th repetition; $N_{col}$ denotes the number of columns of the interleaver; and $N_{CBPS}$ denotes the coded bits per orthogonal frequency-division multiplexing (OFDM) symbol.

In some implementations, the symbol-to-tone mapper 1034 varies in time, and is dependent on t. In particular, the symbol-to-tone mapper 1034 may be updated for each repetition:

$$i = (k + \Delta(t)) \bmod N_{SD}$$

where k is the index of symbols input to the symbol-to-tone mapper 1034, i is the index of tones, $\Delta(t)$ corresponds to an offset for the t-th repetition, and $N_{SD}$ is the total number of data tones.

The block diagrams 1022, 1024, and 1026 each illustrate repetition of the LPLR SIG field in frequency, but each diagram illustrates the frequency repetition as occurring at a different time within a sequence of functional blocks. Each of the diagrams 1022, 1024, and 1026 include an FEC block, an interleaver, a modulation block, and a symbol-to-tone mapper in the same order as shown in the block diagram 1020, except that the frequency repetition is performed at a different position. In general, the LPLR SIG field may be repeated in the frequency domain in a manner similar to MCS10 in 802.11ah, and is repeated in the frequency domain to form F repetitions.

In the second diagram 1022, the repetition block 1036 occurs before the FEC block 1038, which is followed by the interleaver 1040, the modulation block 1042, and the symbol-to-tone mapper 1044. The repetition block 1036 generates F repetitions in the frequency domain for every $N_{DBPS}/F$ bits, wherein $N_{DBPS}$ denotes the number of data bits per OFDM symbol, and scrambling may be done for each repetition in order to reduce PAPR.

In the third diagram 1024, the repetition block 1048 follows the FEC block 1046, and is followed by the interleaver 1050, the modulation block 1052, and the symbol-to-tone mapper 1054. Similar to the repetition block 1036, the repetition block 1048 generates F repetitions in the frequency domain for every NDBPS/F bits, and scrambling may be done for each repetition in order to reduce PAPR.

In the fourth diagram 1026, the repetition block 1062 occurs after the FEC block 1056, the interleaver 1058, and the modulation block 1060, and is followed by the symbol-to-tone mapper 1064. The repetition block 1062 generates F repetitions in the frequency domain for every $N_{CBPS}/N_{BPSCS}$ symbols, wherein $N_{BPSCS}$ denotes the number of bits per subcarrier and stream, and $N_{DBPS}=N_{CBPS} \times \text{coding-rate}$. Moreover, to reduce PAPR and improve performance, different phase rotation, or a different constellation mapping may be applied for each repetition. Specifically, in 1026, phase rotation or constellation mapping is used to reduce PAPR in the bit domain, and scrambling is used in 1022 and 1024 to reduce PAPR in the symbol domain.

In some implementations, the LPLR SIG field is repeated in both the time domain as well as the frequency domain. Time and frequency repetition may be signaled on top of MCS, or at a new MCS level. The new MCS level can be defined with respect to the repetition scheme, which may be at an effectively lower rate.

In some implementations, a device is capable of automatically detecting the LPLR frame format. In an example, a device may sense the carrier via LSTF or LPLR STF, and classifies the frame as an LPLR frame or a non-LPLR frame. LPLR frames may be classified according to one or more characteristics of the LPLR STF, LPLR LTF, and LPLR SIG fields (or other fields) as described herein, or any combination of these fields. In some implementations, one field (e.g., the LPLR STF field) alone may not provide enough information to perform the autodetection. In this case, the one or more other fields (e.g., the LPLR LTF field) may be reviewed to detect the LPLR frame format.

The autodetection may be performed based at least in part on the LPLR STF field. In a first example, the LPLR STF signal itself may be used as a signature. In this case, the LPLR STF uses a different sequence than the LSTF, and is therefore used as a signature to indicate that an LPLR format is present. In a second example, the LPLR STF has a time signature. In this case, the LPLR STF signal may have a different number of periods and/or a different duration for each LPLR STF period. Specifically, a longer LPLR STF signal may lead to a longer autocorrelation falling edge delay relative to a CS rising edge, as autocorrelation may take a longer time to settle for a longer sequence. In a third example, the LPLR STF has a frequency signature. In this case, a longer LPLR STF may be used after the AGC has settled, and a set of the LPLR STF periods may be converted into the frequency domain to identify the frequency domain pattern. The LPLR STF frequency signature may have particular characteristics, such as a bandwidth less than 20 MHz, bandwidth hopping or repetition, and tone spacing or tone sampling, or any suitable combination thereof. These three examples are provided as illustrative methods for performing autodetection based on the LPLR STF field, and may be combined with one another or other methods of autodetection described herein.

The autodetection may be performed based at least in part on the LPLR LTF field. In a first example, the LPLR LTF sequence is masked by a predefined sequence (such as the masking that is done in for 802.11ah LTF1, for example)), or includes a sequence defined differently from the LLTF field. In a second example, the LPLR LTF field is QBPSK modulated, which corresponds to QPSK modulation but rotated 90 degrees. In this case, when multiple LPLR LTF symbols are transmitted, the first symbol, a subset of the symbols, or all the symbols may be QBPSK modulated. In a third example, the LPLR LTF repetition is performed in a different manner than the LLTF is repeated, and the repetition forms a signature. In this case, a different GI or a different repetition of the LPLR LTF sequences may be used. Additionally or alternatively, multiple LPLR LTF symbols may be used to reflect the signature. In a fourth example, the LPLR LTF has a frequency pattern that forms its signature. In this case, the signature may involve a bandwidth of the LPLR LTF field that is less than 20 MHz, or the LPLR LTF field may have a specific frequency hopping or repetition pattern, tone sampling pattern for compressed LPLR LTF, or a different tone sampling over multiple LPLR LTF symbols. These four examples are provided as illustrative methods for performing autodetection based on the LPLR LTF field, and may be combined with one another or other methods of autodetection described herein.

FIG. 11 is a diagram of an illustrative block diagram of localized and distributed processing, in accordance with an embodiment of the present disclosure. In particular, the data in an LPLR frame may use a specific modulation scheme such as orthogonal frequency-division multiplexing (OFDM) or single-carrier (SC) transmission. SC transmission may be beneficial to reduce PAPR. When SC transmission is used, the transmission may be localized, as is shown in the diagram 1170 of FIG. 11, and consecutive tone mapping may be performed at the output of the DFT block. In this case, the tones that are mapped at the output of the DFT may be static, dynamic (e.g., signaled by the LPLR SIG field), or semi-static (e.g., signaled by management/control frames). Alternatively, when SC transmission is used, the transmission may be distributed, as is shown in the diagram 1172 of FIG. 11, and non-consecutive tone mapping may be performed at the output of the DFT block. Similar to the localized example, the tones used in the distributed example may be static, dynamic, or semi-static.

In some implementations, the modulation schemes described in relation to FIG. 11 are used in a hybrid approach. In a first example, a downlink LPLR frame uses OFDM, while uplink LPLR frames use SC transmission. In a second example, uplink LPLR trigger-based frames use SC modulation, while the rest of the frames use OFDM. In a third example, uplink LPLR trigger-based frames use the modulation schemes that are signaled by the trigger frames. In a fourth example, the modulation scheme used in an LPLR frame is signaled in a preamble for the receiver to detect.

Figure 12:
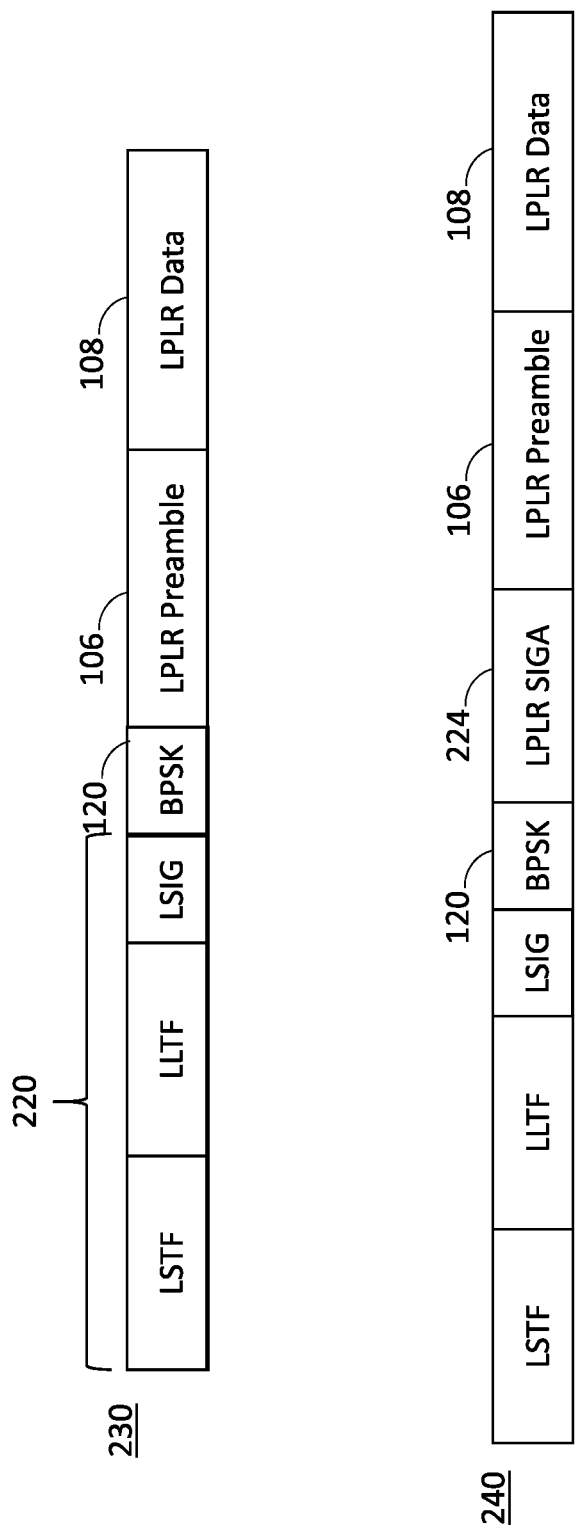
FIG. 12 shows example block diagrams illustrating alternative LPLR packet formats to prevent false detection under 802.11n, in accordance with an embodiment of the present disclosure.

In some embodiments, in addition to the packet format 214, 216 or 218 illustrated in FIG. 2, an alternative frame format for the LPLR packet format may be used with a dummy 4 μs OFDM symbol with BPSK modulation added before the LPLR preamble. For example, when the LPLR packet format 214 or 218 is used, 802.11n devices may falsely detect the LRLP packet to be an 802.11n type packet, and thus decode the packet inaccurately—e.g., the 802.11n device may erroneously set the PHYCCA.indication to the wrong value. FIG. 12 shows example block diagrams illustrating alternative LPLR packet formats to prevent false detection under 802.11n, in accordance with an embodiment of the present disclosure.

Frame 230 has an alternative format to the format 214 in FIG. 2. Similar to 214, frame 230 includes a regular preamble 220, an LPLR preamble 106, and LPLR data portion 108. The regular preamble 220 is a legacy preamble including three fields: LSTF, LLTF, and LSIG. Each of the LSTF, LLTF and LSIG fields may include information similar to the LSTF, LLTF and LSIG fields in frame format 214 as described in FIG. 2. A dummy BPSK symbol 120 is appended at the end of the regular preamble 220 to differentiate the LPLR frame 230 from an 802.11n frame so as to prevent false detection by an 802.11n device. For example, the BPSK symbol 120 is a redundant 20 MHz symbol by modulating nominal content under BPSK, such as repeat LSIG content, a signature LPLR BPSK sequence, and/or the like. In this way, when an 802.11n device receives the frame 230, the 802.11n device will not erroneously treat frame 230 as an 802.11n packet: because in an 802.11n frame, a HT-SIG field follows the LSIG field in the regular preamble, and the HT-SIG field is modulated under QBPSK, instead of BPSK. Thus, by checking the received symbols on the constellation and the polarity of the symbols representing the preamble, an 802.11n device is able to detect that a received packet with the format 230 is not an 802.11n packet, because the symbols after the regular preamble are BPSK modulated.

Frame 240 has an alternative format to the format 218 in FIG. 2. Similar to frame 230, the dummy BPSK symbol 120 is appended after the LSIG field in the regular preamble, which is inserted right before the start of the LPLR SIGA field 224. Similar to the LPLR SIGA field 224 in FIG. 2, the LPLR SIGA 224 is in a regular format of 312.5 KHz tone spacing, and the LPLR SIGA field 224 can be transmitted on a narrow band (e.g., <20 MHz). In this way, frame 240 may be used to avoid false detection as an 802.11n packet in a similar way as described above in relation to frame 230.

The BPSK symbol 120 inserted in frame 230 or 240 may be used to classify the LPLR frames. For example, when the BPSK symbol 120 includes a BPSK sequence, such BPSK sequence may be designed as a LPLR unique signature for the LPLR frame. In this way, when the LPLR frame is received by a LPLR receiver, the receiver may read the data fields from the LPLR frame, and automatically detect and determine the type of the LPLR frame by checking the signature sequence in the BPSK symbol.

The LPLR frame formats described in FIG. 12 may be applied or designed by re-using an 802.11ax Orthogonal frequency-division multiple access (OFDMA) Multi-user (MU) PLOP (Physical Layer Convergence Procedure) protocol data unit (PPDU) format, and tone terminology. For example, the LPLR preamble 106 includes LPLR_SIGA, LPLR_SIGB, LPLR_STF, and LPLR_LTF, which is the same as an 802.11ax frame. The LPLR_SIGA and LPLR_SIGB fields are defined across the full 20 MHz bandwidth. The modulation of the LPLR_SIGB field may be limited to the modulation and coding scheme MCS0 specified in 802.11ax, or MCS0 with dual sub-carrier modulation (DCM), as the MCS0 modulation scheme corresponds to BPSK in 802.11 standards. The LPLR_SIGB field is used to signal one resource unit occupancy or the resource unit size. The LPLR data portion 108 occupies one resource unit, or duplicated the small resource unit content across entire bandwidth of 20 MHz, as further illustrated in FIG. 13.

Figure 13:
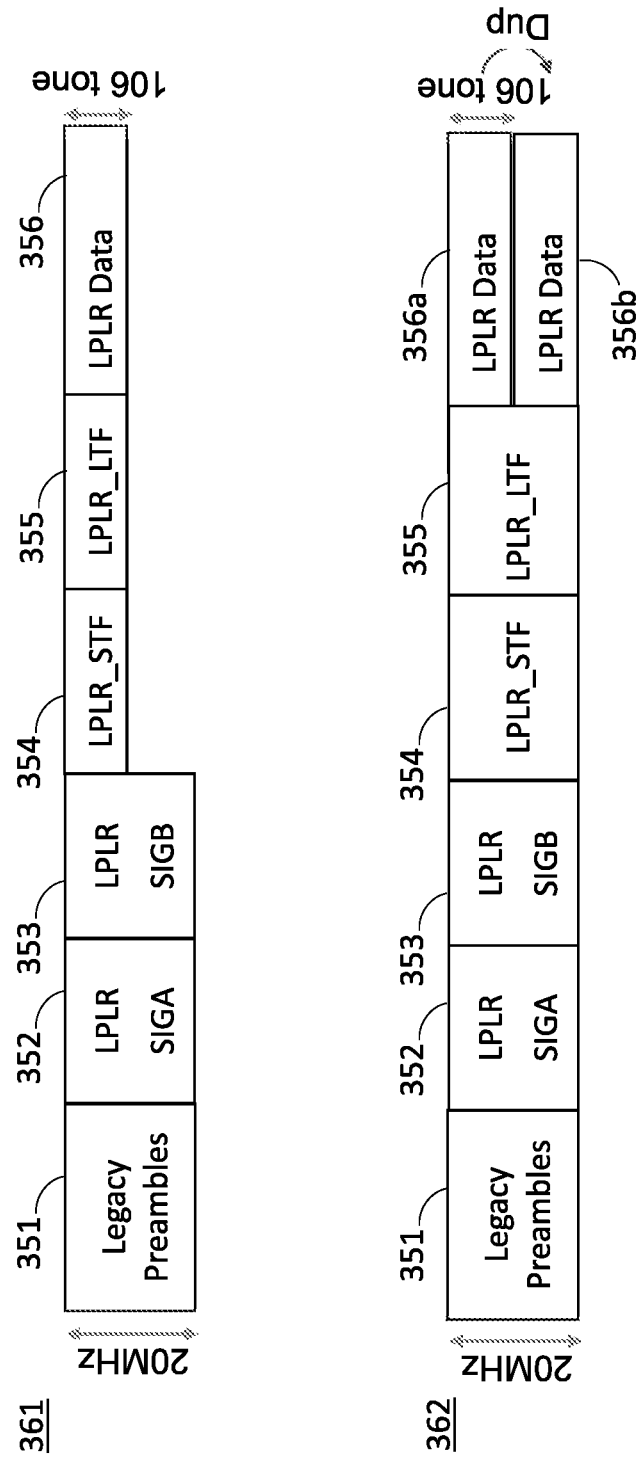
FIG. 13 shows example block diagrams illustrating LPLR data portion transmission over the resource unit, in accordance with an embodiment of the present disclosure.

FIG. 13 shows example block diagrams illustrating LPLR data portion transmission over the resource unit, in accordance with an embodiment of the present disclosure. Block 361 illustrates the signaling and data transmission of the LPLR preamble 106 and LPLR data portion 108 using a single resource unit. The legacy preambles 351, LPLR SIGA field 352, and LPLR SIGB field 353 all occupy the whole bandwidth of 20 MHz, with the LPLR SIGB field 353 signals one resource unit location for transmitting the LPLR data portion. The LPLR STF field 354, LPLR LTF field 355 and the LPLR data portion 356 then only occupies the corresponding resource unit. For example, the resource unit allocated to the LPLR data portion 356 may include 106 tones, which occupies 10 MHz out of the full bandwidth of 20 MHz.

Block 362 illustrates the signaling and data transmission of the LPLR preamble 106 and LPLR data portion 108 by duplicating a small resource unit across the entire bandwidth of 20 MHz. Similar to the block 361, the legacy preambles 351, LPLR SIGA field 352, and LPLR SIGB field 353 all occupy the whole bandwidth of 20 MHz. In addition, other fields in the LPLR preamble such as the LPLR STF field 354, LPLR LTF field 355 also occupy the whole bandwidth. The LPLR SIGB field is used to signal the resource unit size such that the LPLR data portion 356 is duplicated across the full bandwidth. In the above example discussed in relation to block 361, when the resource unit includes 106 tones (10 MHz), and the bandwidth is 20 MHz, the LPLR data portion is duplicated as two duplicate data portions 356*a-b* to be transmitted across the bandwidth.

In some implementations, the duplication of LPLR data portion may include a phase rotation, e.g., data portion 356*b* may be a phase-rotated version of the data portion 356*a*. In some implementations, the duplicated copy 356*b* may include additional scrambling or permutation in either the bit or symbol domain to the LPLR data portion 356*a*.

FIGS. 14-15 show example logic flow diagrams illustrating various aspects of detecting and processing LPLR data frames in relation to FIGS. 1-13, according to embodiments described herein. Processes 1400-1500 may be implemented at a wireless communication device (1605 in FIG. 16) that is operated in compliance with the 802.11 standard, e.g., 802.11ax, 802.11az, 802.11n, etc.

FIG. 14 shows a high level flow chart for a process 1400 for detecting data received in an LPLR data frame format similar to the formats discussed in FIGS. 1-4, in accordance with an embodiment of the present disclosure.

At 1402, the process 1400 includes receiving, e.g., at a wireless receiver, a data frame comprising an LPLR preamble portion and an LPLR data portion following the LPLR preamble portion. The structure of the data frame may be configured (e.g., at a wireless transceiver where the data frame was prepared to be transmitted) such that the LPLR preamble portion and the LPLR data portion may occupy a bandwidth that is less than an allowed bandwidth. At 1404, the mode of the data frame may be determined (e.g., by processing or control circuitry at the wireless receiver, or a computing device communicatively coupled to the wireless receiver) based on whether the data frame includes another portion in addition to the LPLR preamble portion and the LPLR data portion. For example, as is described in relation to FIG. 1, the LPLR data frame format may be in a mixed mode or in a single mode. In the mixed mode 100, the LPLR data frame format additionally includes a legacy preamble (e.g., a regular preamble 104) that precedes the LPLR preamble portion and occupies the full allowed bandwidth (e.g., 20 MHz). In the single mode 102, the legacy preamble is not included in the data frame format.

As is described in relation to FIGS. 1 and 3-5, the allowed bandwidth may be 20 MHz, and the first bandwidth may be less than 20 MHz. Moreover, the LPLR preamble portion and the LPLR data portion may be set at a frequency offset (as described in relation to FIG. 4), where the value of the frequency offset may be signaled or not signaled. The LPLR preamble portion and the LPLR data portion may be duplicated in the frequency domain (as described in relation to FIG. 3), where the duplicates may occupy the full allowed bandwidth (e.g., 20 MHz) or less than the full allowed bandwidth. When the LPLR preamble and LPLR data are duplicated to occupy less than the full allowed bandwidth, a frequency gap may separate adjacent duplicates to reduce interference.

The LPLR preamble portion includes an LPLR STF field, an LPLR LTF field, and an LPLR SIG field. At 1206, any of such fields may be detected or recovered (e.g., by processing or control circuitry at the wireless receiver, or a computing device communicatively coupled to the wireless receiver) from the received data frame. For example, as is described above in relation to FIG. 7, the use and detection of the LPLR STF may depend on the location of a particular device relative to a WIFI network, and may depend on whether the mixed mode LPLR frame format 100 or the single mode LPLR frame format 102 are used. As is described above in relation to FIG. 8, the LPLR LTF field may be replicated multiple (N) times in the time domain, and preceded by a time interval that is M times a length of a regular guard interval. Moreover, a first set of LPLR LTF replicates may be transmitted over even tones, while a second set of LPLR LTF replicates may be transmitted over odd tones. As is described in relation to FIG. 10, the LPLR SIG field may be repeated in time or in frequency, where the replicates of the LPLR SIG field may use different MCS's and/or or have different interleaving and symbol-to-tone mapping schemes. Based on the mode of the data frame and the respective type of the data fields, a specific data field may be detected and/or recovered from the replicates.

Figure 15A:
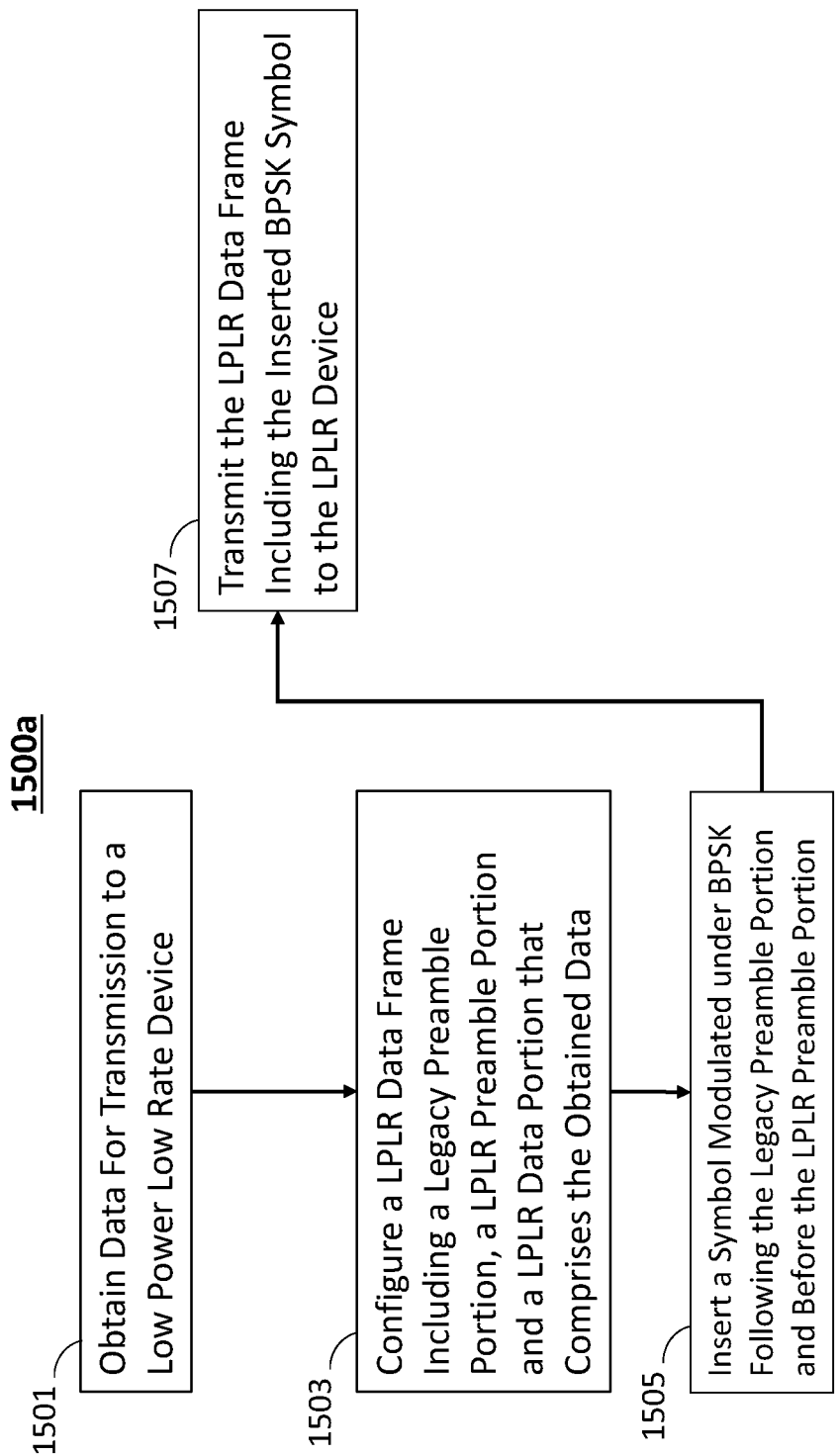
FIG. 15A shows a high level flow chart 1500a for a process 1500a for configuring a low power low rate (LPLR) data frame format, similar to the formats discussed in FIG. 12, for transmission to prevent false detection by a receiver compliant with 802.11n, in accordance with an embodiment of the present disclosure.

FIG. 15A shows a high level flow chart 1500*a* for a process 1500*a* for configuring a low power low rate (LPLR) data frame format, similar to the formats discussed in FIG. 12, for transmission to prevent false detection by a receiver compliant with 802.11n, in accordance with an embodiment of the present disclosure. At 1501, a wireless transmitter (e.g., see 1615 in FIG. 16) obtains data for transmission to a LPLR device. At 1503, the processor at the wireless transmitter may configure a LPLR data frame (e.g., see 230 in FIG. 13) including a legacy preamble portion (e.g., see 220 in FIG. 13), a LPLR preamble portion (e.g., 106 in FIG. 13) and a LPLR data portion (e.g., 108 in FIG. 13) that includes the data for transmission. For example, the processor at the transmitter may configure a LPLR SIGA portion having a format of 312.5 tone spacing, and insert the LPLR SIGA portion (e.g., 224 in FIG. 13) following the symbol modulated under BPSK and before the LPLR preamble portion. For another example, the processor may re-use a format of LPLR preamble under 802.11ax to configure the LPLR preamble portion.

At 1505, the processor at the wireless transmitter may insert a symbol modulated under BPSK (e.g., 120 in FIG. 13) following the legacy preamble portion (e.g., 220 in FIG. 13) and before the LPLR preamble portion (e.g., 106 in FIG. 13). For example, the processor may select a sequence as a signature of the LPLR data frame indicative of a type of the LPLR data frame, and encode the sequence into the symbol under BPSK. For another example, the processor may obtain a LSIG field from the legacy preamble, and encode repeated LSIG content from the LSIG field into the symbol under BPSK.

At 1507 the wireless transmitter is configured to transmit the LPLR data frame including the inserted symbol modulated under binary phase-shift keying to the low power device.

Figure 15B:
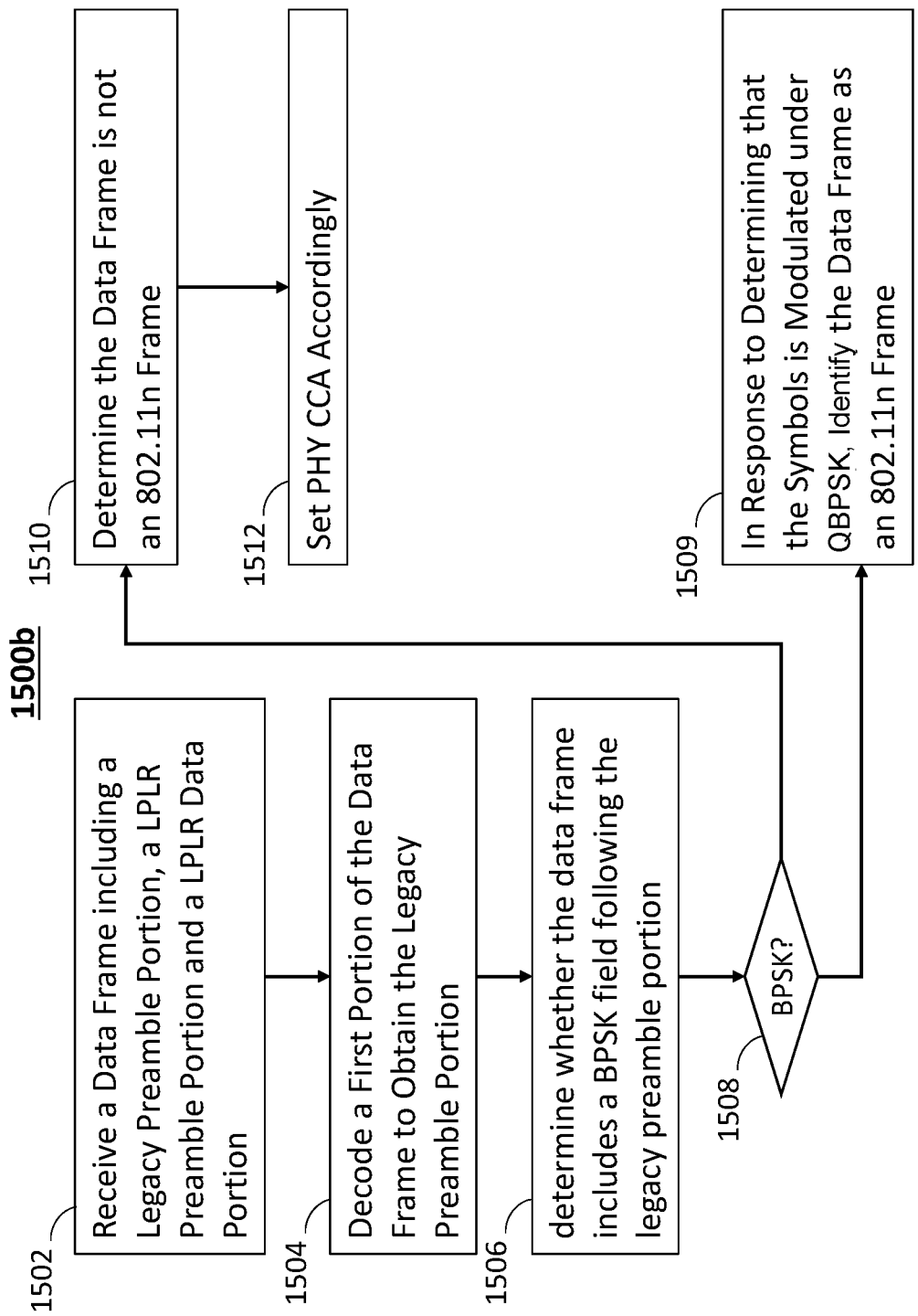
FIG. 15B shows a high level flow chart 1500b for a process 1500b for detecting data received in an LPLR data frame format similar to the formats discussed in FIG. 12 to prevent false detection by an 802.11n device as an 802.11n frame, in accordance with an embodiment of the present disclosure.

FIG. 15B shows a high level flow chart 1500*b* for a process 1500*b* for detecting data received in an LPLR data frame format similar to the formats discussed in FIG. 12 to prevent false detection by an 802.11n device as an 802.11n frame, in accordance with an embodiment of the present disclosure. At 1502, a wireless receiver (e.g., see 1615 in FIG. 16) may receive a data frame (e.g., 230) including a legacy preamble portion (e.g., 220), a LPLR preamble portion (e.g., 106) and a LPLR data portion (e.g., 108) following the LPLR preamble portion. At 1504, the first portion of the data frame is decoded, e.g., by a processor at 1610 in FIG. 16, to obtain the legacy preamble portion (e.g., 220). At 1506, the wireless device (e.g., 1605) determines whether the data frame includes a field (e.g., 120) modulated under BPSK following the legacy preamble portion (e.g., 220). At 1508, in response to determining that the data frame includes the field modulated under BPSK following the legacy preamble portion, process 1500*b* proceeds to 1510, where the data frame is determined not to be an 802.11n frame. In this way, the receiver may avoid false detection of the LPLR frame as an 802.11n frame, and thus the PHY CCA can be set correctly at 1512.

At 1508, if the wireless receiver (e.g., 1610) or the wireless device (e.g., 1605) is compliant with 802.11n, process 1500*b* proceeds to 1509, where in response to determining that the symbol after the legacy preamble is modulated under QBPSK, the data frame may be optionally identified as an 802.11n frame. Thus, the BPSK symbol after the legacy preamble in a LPLR frame helps a device to distinguish from an 802.11n packet.

Figure 16:
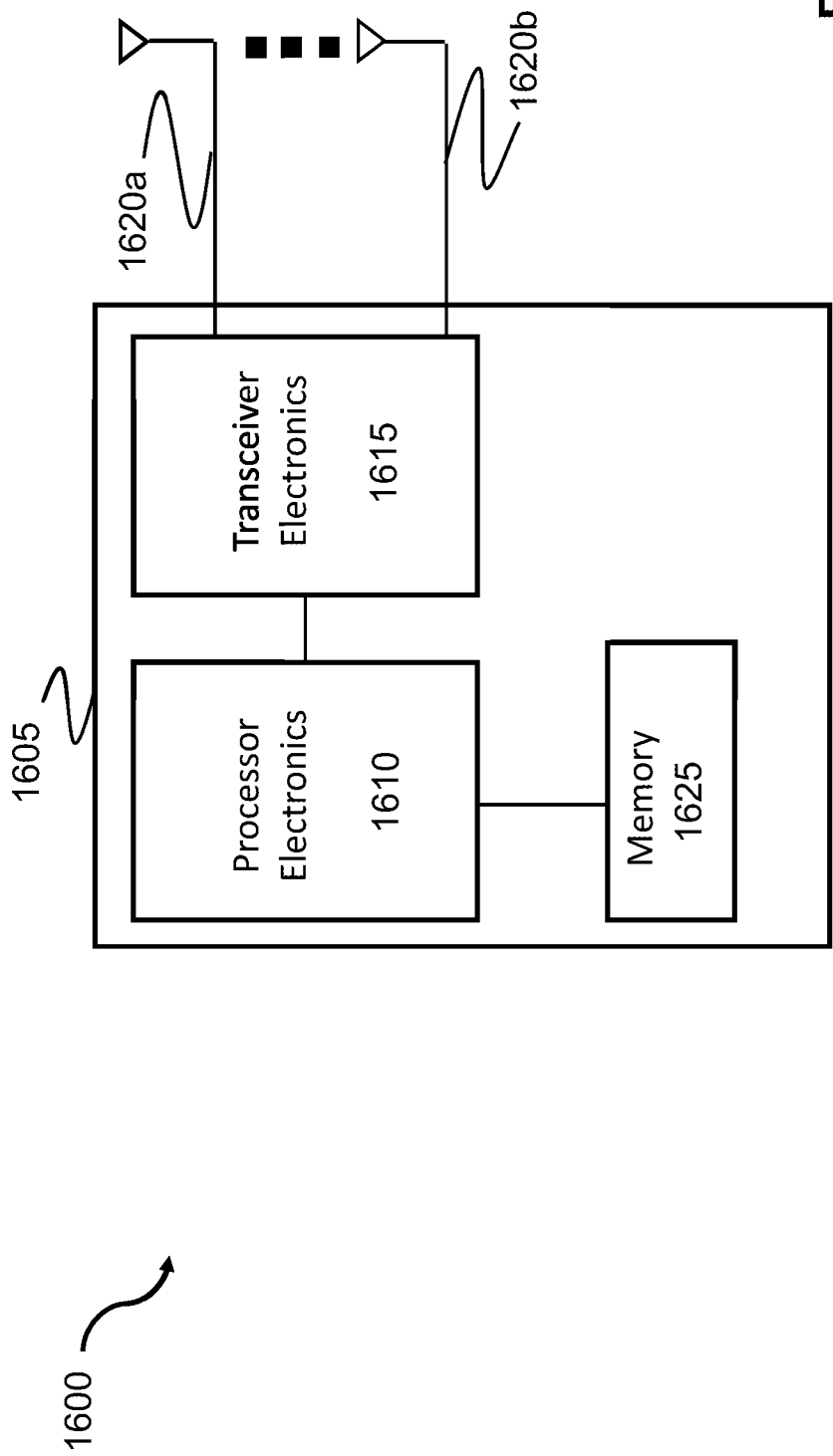
FIG. 16 shows a simplified block diagram 1600 of an example of a wireless communication device 1605, according to embodiments described herein.

FIG. 16 shows a simplified block diagram 1600 of an example of a wireless communication device 1605, according to embodiments described herein. Various examples of device 1605 include an AP, a base station (BS), a client device, an access terminal (AT), a client station, or a mobile station (MS), and/or the like. For example, the device 805 can represent the AP or the client device discussed throughout FIGS. 1-15.

The device 1605 can include processor electronics 810 such as one or more processors that implement methods effecting the techniques presented in this disclosure. The processor electronics 1610 can be operable to execute computer-readable instructions that, when executed on the processor electronics 1610, cause the device 1605 to implement methods (e.g., processes 1400-1500) effecting the techniques presented in this disclosure. For example, the processor electronics 1610 can cause the device 1605 to receive and decode a LPLR data frame.

The device 1605 can include transceiver electronics 1615 (e.g., a transmitter, receiver, or transceiver) to send and/or receive wireless signals over one or more antennas 1620*a*-1620*b*. In some embodiments, transceiver electronics 1615 can include multiple radio units. In some embodiments, a radio unit includes a baseband unit (BBU) and a radio frequency unit (RFU) to transmit and receive signals. In some embodiments, the device 1605 includes dedicated circuitry for transmitting (e.g., a dedicated transmitter) and dedicated circuitry for receiving (e.g., a dedicated receiver).

For example, transceiver electronics 1615 can include one or more receivers that receive one or more signals from one or more antennas 1620*a*-1620*b*, transmitted over one or more WLAN channels. The transceiver antennas 1620*a*-*b* and the transceiver electronics 815 are configured to The device 1605 can include one or more memories 1625 configured to store information such as data and/or instructions (e.g., computer-readable instructions that cause the device 1605 to implement methods effecting the techniques presented in this disclosure.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this should not be understood as requiring that such operations be performed in the particular order shown or in sequential order, or that all illustrated operations be performed, to achieve the desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

Suitable computer program code residing on a computer-readable medium may be provided for performing one or more functions in relation to performing the processes as described herein. The term "computer-readable medium" as used herein refers to any non-transitory or transitory medium that provides or participates in providing instructions to a processor or other control/processing circuitry of the computing device (e.g., including a wireless receiver, transceiver, etc.) for execution. Such a medium may take many forms, including but not limited to non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A system for configuring a low power low rate (LPLR) data frame format for transmission to prevent false detection by a receiver compliant with 802.11n standard, the system comprising:
a processor configured to:
obtain data for transmission to a low power device;
configure a LPLR data frame including (i) a legacy preamble portion, (ii) a LPLR preamble portion and (iii) a LPLR data portion, wherein the LPLR data portion includes the data for transmission;
insert a dummy symbol following the legacy preamble portion and before the LPLR preamble portion, wherein the dummy symbol comprises a sequence modulated with binary phase-shift keying (BPSK), the BPSK modulated sequence being a unique signature for the LPLR data frame, the dummy symbol causing a receiving LPLR device to detect the LPLR data frame by detecting the BPSK modulation of the dummy symbol, the BPSK modulated sequence of the dummy symbol identifying an LPLR data frame type and the LPLR data frame is not an 802.11n type frame, the BPSK modulated sequence indicating that the LPLR data frame type has one of a first LPLR frame format and a second LPLR frame format; and
a wireless transmitter configured to transmit the LPLR data frame including the inserted dummy symbol modulated under binary phase-shift keying to the low power device.

2. The system of claim 1, wherein the processor is further configured, when inserting the symbol modulated under binary phase-shift keying following the legacy preamble portion and before the LPLR preamble portion, to:
obtain a LSIG field from the legacy preamble; and
encode repeated LSIG content from the LSIG field into the symbol under binary phase-shifting keying.

3. The system of claim 1, wherein the processor is further configured, when configuring a LPLR data frame, to:
configure a LPLR SIGA portion having a format of 312.5 KHz tone spacing; and
insert the LPLR SIGA portion following the symbol modulated under binary phase-shift keying and before the LPLR preamble portion.

4. The system of claim 1, wherein the processor is further configured, when configuring a LPLR data frame, to:
re-use a format of 802.11ax preamble to configure the LPLR preamble portion.

5. The system of claim 1, wherein the processor is further configured, when configuring the LPLR data frame, to:
configure a LPLR SIGB field that signals a resource unit smaller than an allowed bandwidth; and
transmit the LPLR preamble portion and the LPLR data portion on the single resource unit smaller than the allowed bandwidth.

6. The system of claim 1, wherein the processor is further configured, when configuring the LPLR data frame, to:
configure a LPLR SIGB field that signals a size of a resource unit smaller than an allowed bandwidth;
duplicate the LPLR data portion to occupy the allowed bandwidth.

7. A system for detecting data received in a low power low rate (LPLR) data frame format to prevent false detection under 802.11n standard, the system comprising:
a wireless receiver configured to:
receive a data frame including a legacy preamble portion, a LPLR preamble portion and a LPLR data portion following the LPLR preamble portion; and
a processor configured to:
decode a first portion of the data frame to obtain the legacy preamble portion;
determine whether the data frame includes a field following the legacy preamble portion, wherein the field includes a dummy symbol which comprises a sequence modulated with binary phase-shift keying (BPSK), the BPSK modulated sequence being a unique signature for the LPLR data frame;
detect that the data frame has the LPLR data frame format by detecting the BPSK modulation of the dummy symbol;
detect the BPSK modulated sequence of the dummy symbol, the BPSK modulated sequence of the dummy symbol identifying an LPLR data frame type and the LPLR data frame is not an 802.11n type frame, the BPSK modulated sequence indicating that the LPLR data frame type has one of a first LPLR frame format and a second LPLR frame format; and
based on the type of the data frame, restrict from identifying the data frame as an 802.11n frame.

8. The system of claim 7, wherein the processor is further configured, when determining whether the data frame includes a field modulated under binary phase-shift keying following the legacy preamble portion, to:
obtain the symbol following the legacy preamble portion;
determine whether the symbol is modulated under binary phase-shift keying or quadrature binary phase shift keying based on a constellation point and a polarity corresponding to the symbol; and
in response to determining that the symbol is not modulated under quadrature binary phase shift keying, not identifying the data frame as the 802.11n frame.

9. A method for configuring a low power low rate (LPLR) data frame format for transmission to prevent false detection by a receiver compliant with 802.11n standard, the method comprising:
obtaining, at a wireless transmitter, data for transmission to a low power device;
configuring a LPLR data frame including (i) a legacy preamble portion, (ii) a LPLR preamble portion and (iii) a LPLR data portion, wherein the LPLR data portion includes the data for transmission;
inserting a dummy symbol following the legacy preamble portion and before the LPLR preamble portion, wherein the dummy symbol comprises a sequence modulated with binary phase-shift keying (BPSK), the BPSK modulated sequence being a unique signature for the LPLR data frame, the dummy symbol causing a receiving LPLR device to detect the LPLR data frame by detecting the BPSK modulation of the dummy symbol, the BPSK modulated sequence of the dummy symbol identifying an LPLR data frame type and the LPLR data frame is not an 802.11n type frame, the BPSK modulated sequence indicating that the LPLR data frame type has one of a first LPLR frame format and a second LPLR frame format; and
transmitting the LPLR data frame including the inserted symbol modulated under binary phase-shift keying to the low power device.

10. The method of claim 9, wherein the inserting the symbol modulated under binary phase-shift keying following the legacy preamble portion and before the LPLR preamble portion comprises:

obtaining a LSIG field from the legacy preamble; and
encoding repeated LSIG content from the LSIG field into the symbol under binary phase-shifting keying.

11. The method of claim 9, wherein the configuring a LPLR data frame further comprises:
configuring a LPLR SIGA portion having a format of 312.5 KHz tone spacing; and
inserting the LPLR SIGA portion following the symbol modulated under binary phase-shift keying and before the LPLR preamble portion.

12. The method of claim 9, wherein the configuring a LPLR data frame further comprises:
re-using a format of LPLR preamble under 802.11ax to configure the LPLR preamble portion.

13. The method of claim 9, wherein the configuring the LPLR data frame further comprises:
configuring a LPLR SIGB field that signals a resource unit smaller than an allowed bandwidth; and
transmitting the LPLR preamble portion and the LPLR data portion on the single resource unit smaller than the allowed bandwidth.

14. The method of claim 9, wherein the configuring the LPLR data frame further comprises:
configuring a LPLR SIGB field that signals a size of a resource unit smaller than an allowed bandwidth;
duplicating the LPLR data portion to occupy the allowed bandwidth.

15. A method for detecting data received in a low power low rate (LPLR) data frame format to prevent false detection under 802.11n standard, the method comprising:
receiving, at a wireless receiver, a data frame including (i) a legacy preamble portion, (ii) a LPLR preamble portion and (iii) a LPLR data portion following the LPLR preamble portion;
decoding a first portion of the data frame to obtain the legacy preamble portion;
determining whether the data frame includes a dummy symbol following the legacy preamble portion, wherein the dummy symbol comprises a sequence modulated with binary phase-shift keying (BPSK), the BPSK modulated sequence being a unique signature for the LPLR data frame;
detecting that the data frame has the LPLR data frame format by detecting the BPSK modulation of the dummy symbol;

detecting the BPSK modulated sequence of the dummy symbol, the BPSK modulated sequence of the dummy symbol identifying an LPLR data frame type and the LPLR data frame is not an 802.11n type frame, the BPSK modulated sequence indicating that the LPLR data frame type has one of a first LPLR frame format and a second LPLR frame format; and
based on the type of the data frame, restricting from identifying the data frame as an 802.11n data frame.

16. The method of claim 15, wherein the determining whether the data frame includes a field with the dummy symbol modulated under binary phase-shift keying following the legacy preamble portion comprises:
obtaining the symbol following the legacy preamble portion;
determining whether the symbol is modulated under binary phase-shift keying or quadrature binary phase shift keying based on a constellation point and a polarity corresponding to the symbol;
in response to determining that the symbol is not modulated under quadrature binary phase shift keying, not identifying the data frame as an 802.11n frame.

17. The system of claim 1, wherein a short training field duration in the LPLR preamble portion varies based on whether the LPLR data frame is a beacon frame or not a beacon frame.

18. The system of claim 7, wherein a short training field duration in the LPLR preamble portion varies based on whether the LPLR data frame is a beacon frame or not a beacon frame.

19. The method of claim 9, wherein a short training field duration in the LPLR preamble portion varies based on whether the LPLR data frame is a beacon frame or not a beacon frame.

20. The method of claim 15, wherein a short training field duration in the LPLR preamble portion varies based on whether the LPLR data frame is a beacon frame or not a beacon frame.

21. The system of claim 1, wherein the LPLR data frame type defines one or more characteristics of a LPLR short training field, LPLR long training field, and LPLR signal field.

* * * * *